(12) United States Patent
Kido et al.

(10) Patent No.: US 7,079,231 B2
(45) Date of Patent: Jul. 18, 2006

(54) OPTICAL NETWORK ANALYZER

(75) Inventors: Takashi Kido, Tokyo (JP); Shoji Niki, Tokyo (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 11/273,693

(22) Filed: Nov. 14, 2005

(65) Prior Publication Data

US 2006/0062574 A1    Mar. 23, 2006

Related U.S. Application Data

(60) Division of application No. 10/676,204, filed on Oct. 1, 2003, now Pat. No. 6,980,288, which is a continuation of application No. PCT/JP02/03285, filed on Apr. 2, 2002.

(30) Foreign Application Priority Data

Apr. 2, 2001  (JP)  ............................ 2001-102933
Jan. 8, 2002  (JP)  ............................ 2002-001521

(51) Int. Cl.
*G01N 21/00*  (2006.01)

(52) U.S. Cl. ...................................................... 356/73.1

(58) Field of Classification Search .................... None
See application file for complete search history.

(56) References Cited

U.S. PATENT DOCUMENTS 5,157,530 A * 10/1992 Loeb et al. .................... 398/79
5,995,228 A * 11/1999 Otani et al. .................. 356/364
6,728,491 B1 * 4/2004 Ooi et al. ..................... 398/147

* cited by examiner

*Primary Examiner*—Tu T. Nguyen
(74) *Attorney, Agent, or Firm*—Osha Liang LLP

(57) ABSTRACT

An optical network analyzer for measuring an optical characteristic of an object to be measured, including: a first multiplexer for multiplexing a first optical signal which has transmitted the object to be measured, and a second optical signal having a frequency different from the first optical signal, and for outputting a third optical signal; a first photoelectrical converter for converting the third optical signal into a first electric signal; and a phase measurement block for comparing phases of the first electric signal and a first reference signal.

7 Claims, 16 Drawing Sheets

OPTICAL NETWORK ANALYZER

The present application is a divisional application of U.S. patent application Ser. No. 10/676,204, filed Oct. 1, 2003 now U.S. Pat. No. 6,980,288, which is a continuation application of PCT/JP02/03285 filed on Apr. 2, 2002, claiming priority from Japanese patent applications Nos. 2001-102933 filed on Apr. 2, 2001 and 2002-001521 filed on Jan. 8, 2002, the contents of which are incorporated herein by reference.

BACKGROUND OF THE INVENTION

1. Field of the Invention

The present invention relates to an optical network analyzer for measuring transmission characteristic, delay characteristic, etc. of light in various optical elements.

2. Description of Related Art

FIG. 15 is a block diagram showing a configuration of a conventional optical network analyzer. The conventional optical network analyzer has been disclosed by following references as the apparatus for performing chromatic dispersion measurement of an object to be measured in near infrared region. (Cf. S. Ryu, Y. Horiuchi, K. Mochiuki, "Novel chromatic dispersion measurement method over continuous Gigahertz tuning range," J. Lightwave Technol., vol. 7, no. 8, pp. 1177–1180, 1989; M. Fujise, M. Kuwazuru, M. Nunokawa, and Y. Iwamoto, "Chromatic dispersion measurement over a 100-km dispersion shifted single-mode fiber by a new phase-shift technique," Electron. Lett., vol. 22, no. 11, pp. 570–572, 1986)

The conventional optical network analyzer shown in FIG. 15 includes an optical measurement section 700, an object to be measured 200, and a network analyzer 750. The optical measurement section 700 includes a wavelength variable light source 702, an optical intensity modulator 704, a referential high frequency signal source 706, a photoelectrical converter 708, and an amplifier 710. The optical signal generated by the wavelength variable light source 702 is incidence on the object to be measured 200 after the optical intensity modulator 704 sinusoidally modulates intensity of the optical signal by a referential high frequency signal supplied from the referential high frequency signal source 706. Then, the optical signal which has transmitted the object to be measured 200 is converted into an electric signal by the photoelectrical converter 708, the electric signal is amplified by the amplifier 710, and is input into the network analyzer 750 as a measured signal.

The network analyzer 750 calculates phase shift of the measured signal by comparing the phase of the reference signal supplied from the referential high frequency signal source 706 and the measured signal input from the amplifier 710. A propagation delay time $\tau(\lambda_i)$ of the measured signal is expressed by the following equation using phase $\phi(\lambda_i, f_{IF})$.

$$\tau(\lambda_i) = \phi(\lambda_i, f_{IF})/2\pi f_{IF}$$

Where the wavelength of an optical signal is $\lambda_i$, and the optical intensity modulation frequency is $f_{IF}$.

Therefore, the propagation delay time $\tau(\lambda_i)$ for every wavelength is calculated by measuring the wavelength of the light generated by the wavelength variable light source 702 with the wavelength of the light being changed continuously. A chromatic dispersion $D(\lambda_i)$ is given by differentiating the propagation delay time with respect to the wavelength, and is calculated by the following equations.

$$D(\lambda_i) = \Delta\tau(\lambda_i)/\Delta\lambda_i$$

Where, $$\Delta\tau(\lambda_i) = \tau(\lambda_{i+1}) - \tau(\lambda_i)$$

$$\Delta\lambda_i = \lambda_{i+1} - \lambda_i$$

FIG. 16 is a block diagram showing a configuration of the conventional image detection apparatus. The conventional image detection apparatus shown in FIG. 16 is an apparatus for imaging a tomogram of an object to be measured, such as a biological sample, disclosed by Japanese Patent Laid-Open No. 2-150747 bulletin and Japanese Patent Laid-Open No. 2000-121550 bulletin.

The conventional image detection apparatus shown in FIG. 16 includes an optical measurement section 800 and an image processing apparatus 850. The optical measurement section 800 includes a laser light source 802, a lens 804, a lens 806, a beam splitter 808, a mirror 810, a mirror 812, an optical-frequency converter 814, a referential high frequency signal source 816, a beam splitter 818, and a photoelectrical converter 820. The laser beam generated by the laser light source 802 is irradiated to the object to be measured 200, only rectilinear component of the transmitting laser beam is detected by optical heterodyne detection with the photoelectrical converter 820 by utilizing the directivity of optical heterodyne detection. The output of the photoelectrical converter 820 is input into the image processing apparatus 850 including a demodulator, a computer, and an image displaying apparatus. The image processing apparatus 850 images an optical tomogram, using only the intensity of a transmitting laser beam as information, and does not measure phase information.

According to the conventional optical network analyzer shown in FIG. 15, (1) since it employs direct detection system for converting the frequency of an optical signal to electric signal directly, signal-to-noise ratio is about 10–20 db lower than the signal-to-noise ratio when the heterodyne-detection system is employed. Therefore, when an object with heavy losses is to be measured, dynamic range becomes narrow and accuracy of the measurement is aggravated or even it is impossible to measure the object.

(2) Since not only the object to be measured 200 but also the optical intensity modulator 704 is provided between the wavelength variable light source 702 and the photoelectrical converter 708, the drift of the transmission characteristic of the optical intensity modulator 704 has direct influence on the accuracy of measurement of dispersion and the like.

(3) Since the optical intensity modulator 704 modulates intensity of the optical signal, bandwidth of spectrum of the optical signal being incidence on the device under test 200 is two times wider than the modulation frequency, and it is unable to obtain high wavelength resolution of the modulation frequency. That is, it is ideal that the spectrum of the optical signal to be incidence on the device under test is a coherent light having constant amplitude.

(4) In order to increase resolution of delay time, the wide-band optical intensity modulator 708 is required. There is a trade-off relation between the resolution described in (3) and the wide bandwidth.

According to the conventional image detection apparatus shown in FIG. 16, (1) since the laser beam generated by laser light source 802 is input into the photoelectrical converter 820 after it has passed through the lens 804, the lens 806, the beam splitter 808, the mirror 810, the object to be measured 200, the optical-frequency converter 814, the mirror 812, and the beam splitter 818, a path becomes long and its loss becomes large.

(2) Since there are two paths of the laser beam, i.e., a path via the object to be measured 200 and a path via the optical-frequency converter 814, adjustment of optical axis is complicated.

(3) Since phase comparison is not done, the propagation delay time etc. cannot be measured.

(4) Since the wavelength of the laser beam generated by the laser light source 802 is not variable or the laser beam is not swept, neither information on the wavelength characteristics nor the wavelength distribution of the object to be measured 200 can be obtained.

SUMMARY OF THE INVENTION

Therefore, it is an object of the present invention to provide an optical network analyzer which can solve the aforesaid problem. The above and other objects can be achieved by combinations described in the independent claims. The dependent claims define further advantageous and exemplary combinations of the present invention.

In order to solve the aforesaid problem, according to a first aspect of the present invention, there is provided an optical network analyzer for measuring an optical characteristic of an object to be measured. The optical network analyzer includes: a first multiplexer for multiplexing a first optical signal which has transmitted the object to be measured, and a second optical signal having a frequency different from the first optical signal, and for outputting a third optical signal; a first photoelectrical converter for converting the third optical signal into a first electric signal; and a phase measurement block for comparing phases of the first electric signal and the first reference signal.

The optical network analyzer may further include: a light source for generating a fourth optical signal; a first demultiplexer for demultiplexing the fourth optical signal and for outputting the first optical signal and the second optical signal; a first reference signal generating section for generating the first reference signal; and a frequency converter for converting a frequency of the second optical signal based on the first reference signal.

The optical network analyzer may further include: a first divider for dividing a frequency of the first electric signal; and a second divider for dividing a frequency of the first reference signal. The phase measurement block may receive the first electric signal, of which the frequency is divided by the first divider, and the first reference signal, of which the frequency is divided by the second divider, and may compare the phases of the first electric signal and the first reference signal.

The optical network analyzer may further include an amplitude measurement section for receiving the first electric signal converted by the first photoelectrical converter, and for measuring amplitude of the first optical signal which has transmitted the object to be measured.

The optical network analyzer may further include: a first divider for dividing a frequency of the first electric signal; and a reference signal generating section for generating a reference signal. The first reference signal generating section may generate the first reference signal and the second reference signal based on the reference signal, and the phase measurement block may receive the first electric signal, of which the frequency is divided by the first divider, and the second reference signal generated by the first reference signal generating section, and may compare the phases of the first electric signal and the second reference signal.

The optical network analyzer may further include: a second reference signal generating section for generating a second reference signal; a first multiplier for converting a frequency of the first electric signal based on the second reference signal; a first filter for passing a predetermined frequency component of the first electric signal of which the frequency is converted by the first multiplier; a second multiplier for converting a frequency of the first reference signal based on the second reference signal; and a second filter for passing a predetermined frequency component of the first reference signal, of which the frequency is converted by the second multiplier, for extracting the first reference signal. The first divider may divide the frequency of the first electric signal which has passed through the first filter, and the second divider may divide the frequency of the first reference signal which has passed through the second filter.

The optical network analyzer may further include: a second multiplexer for multiplexing a fourth optical signal reflected from the object to be measured and a fifth optical signal having a frequency different from the fourth optical signal, and for outputting a sixth optical signal; and a second photoelectrical converter for converting the sixth optical signal into a second electric signal. The phase measurement block further compares phases of the second electric signal and the first reference signal.

The optical network analyzer may further include: a light source for generating a seventh optical signal; a first demultiplexer for demultiplexing the seventh optical signal and for outputting the first optical signal and an eighth optical signal; a directional coupler, being provided between the first demultiplexer and the object to be measured, for allowing the fourth optical signal, which has been reflected from the object to be measured by outputting the first optical signal to the object to be measured, to pass through the directional coupler; a first reference signal generating section for generating a first reference signal; a frequency converter for converting a frequency of the eighth optical signal based on the first reference signal; and a second demultiplexer for demultiplexing the eighth optical signal, of which the frequency is converted, to the second optical signal and the fifth optical signal.

The optical network analyzer may further include: a first divider for dividing a frequency of the first electric signal; a second divider for dividing a frequency of the second electric signal; and a third divider for dividing a frequency of the first reference signal. The phase measurement block may receive the first electric signal, of which the frequency is divided by the first divider, the second electric signal, of which the frequency is divided by the second divider, and the first reference signal, of which the frequency is divided by the third divider, and may compare phases of the first electric signal and the first reference signal, and phases of the second electric signal and the first reference signal.

The optical network analyzer may further include an amplitude measurement section for receiving the first electric signal converted by the first photoelectrical converter and the second electric signal converted by the second photoelectrical converter, and for measuring amplitude of the first optical signal which has transmitted the object to be measured and the fourth optical signal reflected from the object to be measured.

The optical network analyzer may further include: a first divider for dividing a frequency of the first electric signal; a second divider for dividing a frequency of the second electric signal; and a reference signal generating section for generating a reference signal. The first reference signal generating section may generate the first reference signal and the second reference signal based on the reference signal, and the phase measurement block may receive the first electric signal, of which the frequency is divided by the first divider, the second electric signal, of which the frequency is divided by the second divider, and the second reference signal generated by the first reference signal generating section, and may compare phases of the first electric signal and the second reference signal, and phases of the second electric signal and the second reference signal.

The optical network analyzer may further include: a light source for generating a fourth optical signal; a first demultiplexer for demultiplexing the fourth optical signal and for outputting the first optical signal and the second optical signal; a first reference signal generating section for generating a first reference signal; and a frequency converter for converting a frequency of the first optical signal, which has transmitted the object to be measured, based on the first reference signal.

According to a second aspect of the present invention, there is provided an optical network analyzer for measuring an optical characteristic of an object to be measured. The optical network analyzer includes: a first multiplexer for multiplexing a first optical signal which has transmitted the object to be measured, and a second optical signal having a frequency different from the first optical signal, and for outputting a third optical signal; a first photoelectrical converter for converting the third optical signal into a first electric signal; a second multiplexer for multiplexing a fourth optical signal having substantially the same frequency as the first optical signal, and a fifth optical signal having substantially the same frequency as the second optical signal, and for outputting a sixth optical signal; a second photoelectrical converter for converting the sixth optical signal into a second electric signal; and a phase measurement block for comparing phases of the first electric signal and the second electric signal.

The optical network analyzer may further include: a light source for generating a seventh optical signal; a first demultiplexer for demultiplexing the seventh optical signal and for outputting an eighth optical signal and a ninth optical signal; a second demultiplexer for demultiplexing the eighth optical signal, and for outputting the first optical signal and the fourth optical signal; a first reference signal generating section for generating a first reference signal; a frequency converter for converting a frequency of the ninth optical signal based on the first reference signal; and a third demultiplexer for demultiplexing the ninth optical signal, of which the frequency is converted, to the second optical signal and a fifth optical signal.

The optical network analyzer may further include: a first divider for dividing a frequency of the first electric signal; and a second divider for dividing a frequency of the second electric signal. The phase measurement block may receive the first electric signal, of which the frequency is divided by the first divider, and the second electric signal, of which the frequency is divided by the second divider, and may compare phases of the first electric signal and the second electric signal.

The optical network analyzer may further include an amplitude measurement section for receiving the first electric signal converted by the first photoelectrical converter and for measuring amplitude of the first optical signal which has transmitted the object to be measured.

The amplitude measurement section may further receive the second electric signal converted by the second photoelectrical converter, and may compare amplitude of the first optical signal and the fourth optical signal.

The optical network analyzer may further include: a third multiplexer for multiplexing a seventh optical signal reflected from the object to be measured and an eighth optical signal having substantially the same frequency as the second optical signal, and for outputting a ninth optical signal; and a third photoelectrical converter for converting the ninth optical signal into a third electric signal. The phase measurement block may further compare phases of the third electric signal and the second electric signal.

The optical network analyzer may further include: a light source for generating a tenth optical signal; a first demultiplexer for demultiplexing the tenth optical signal and for outputting the first optical signal and an eleventh optical signal; a directional coupler, being provided between the first demultiplexer and the object to be measured, for allowing the seventh optical signal, which has been reflected from the object to be measured by outputting the first optical signal to the object to be measured, and the fourth optical signal, to pass through the directional coupler; a first reference signal generating section for generating a first reference signal; a frequency converter for converting a frequency of the eleventh optical signal based on the first reference signal; and a second demultiplexer for demultiplexing the eleventh optical signal, of which the frequency is converted, to the second optical signal, the fifth optical signal, and the eighth optical signal.

The optical network analyzer may further include: a first divider for dividing a frequency of the first electric signal; a second divider for dividing a frequency of the second electric signal; and a third divider for dividing a frequency of the third electric signal. The phase measurement block may receive the first electric signal, of which the frequency is divided by the first divider, the second electric signal, of which the frequency is divided by the second divider, and the third electric signal, of which the frequency is divided by the third divider, and may compare phases of the first electric signal and the second electric signal, and phases of the second electric signal and the third electric signal.

The optical network analyzer may further include an amplitude measurement section for receiving the first electric signal converted by the first photoelectrical converter and the third electric signal converted by the third photoelectrical converter, and for measuring amplitude of the first optical signal which has transmitted the object to be measured and the seventh optical signal reflected from the object to be measured.

The amplitude measurement section may further receive the second electric signal converted by the second photoelectrical converter, and may compare amplitude of the first optical signal and the fourth optical signal, and amplitude of the fourth optical signal and the seventh optical signal.

The optical network analyzer may further include: a first light source for generating a seventh optical signal; a first demultiplexer for demultiplexing the seventh optical signal and for outputting the first optical signal and the fourth optical signal; a second light source for generating the eighth optical signal; and a second demultiplexer for demultiplexing the eighth optical signal and for outputting the second optical signal and the fifth optical signal.

The optical network analyzer may further include: a first divider for dividing a frequency of the first electric signal; and a second divider for dividing a frequency of the second electric signal. The phase measurement block may receive the first electric signal, of which the frequency is divided by the first divider, and the second electric signal, of which the frequency is divided by the second divider, and may compare phases of the first electric signal and the second electric signal.

The optical network analyzer may further include an amplitude measurement section for receiving the first electric signal converted by the first photoelectrical converter and for measuring amplitude of the first optical signal which has transmitted the object to be measured.

The amplitude measurement section may further receive the second electric signal converted by the second photoelectrical converter, and may compare amplitude of the first optical signal and the fourth optical signal.

According to a third aspect of the present invention, an optical network analyzer includes: a wavelength variable light source; a demultiplexer for demultiplexing a light discharged from the wavelength variable light source to a plurality of demultiplexed lights; a frequency converter for converting a frequency of one of the demultiplexed lights demultiplexed by the demultiplexer; a multiplexer for multiplexing the demultiplexed light, of which the frequency is converted by the frequency converter, and the demultiplexed light which has transmitted the object to be measured; a photoelectrical converter for receiving the multiplexed light multiplexed by the multiplexer and for converting it into an electric signal; a referential high frequency signal source for supplying a referential high frequency signal to the frequency converter; and a phase amplitude measurement block. The conversion output of the photoelectrical converter is input into an amplitude and phase measurement input terminal of the phase amplitude measurement block, and the reference signal of the referential high frequency signal source is input into the reference signal input terminal of the phase amplitude measurement block.

According to a fourth aspect of the present invention, an optical network analyzer includes: a wavelength variable light source; a first demultiplexer for demultiplexing a light discharged from the wavelength variable light source to a plurality of demultiplexed lights; a frequency converter for converting a frequency of one of the demultiplexed lights demultiplexed by the first demultiplexer; a second demultiplexer for further demultiplexing another demultiplexed light demultiplexed by the first demultiplexer to a plurality of demultiplexed lights; a third demultiplexer, being provided at the output of the frequency converter, for further demultiplexing the demultiplexed light, of which the frequency is converted by the frequency converter, to a plurality of demultiplexed lights; a first multiplexer for multiplexing one of the demultiplexed lights demultiplexed by the second demultiplexer and has transmitted the object to be measured, and one of the demultiplexed lights demultiplexed by the third demultiplexer; a second multiplexer for multiplexing another demultiplexed light demultiplexed by the second demultiplexer, and another demultiplexed light demultiplexed by the third demultiplexer; a first photoelectrical converter and a second photoelectrical converter for converting the multiplexed lights output from the first multiplexer and the second multiplexer, separately and respectively, and for acquiring a measured signal and a reference signal; a referential high frequency signal source for supplying a reference high frequency signal to the frequency converter, and a phase amplitude measurement block. The conversion output of the first photoelectrical converter is input into an amplitude and phase measurement input terminal of the phase amplitude measurement block, and the conversion output of the second photoelectrical converter is input into a reference signal input terminal of the phase amplitude measurement block.

According to a fifth aspect of the present invention, an optical network analyzer includes: a wavelength variable light source; a first demultiplexer for demultiplexing a light discharged from the wavelength variable light source to a plurality of demultiplexed lights; an optical waveguide for guiding one of the demultiplexed lights demultiplexed by the first demultiplexer to an object to be measured; a directional coupler, being provided in the optical waveguide, for allowing the light which has been reflected from the object to be measured to pass through the directional coupler; a frequency converter for converting the frequency of another demultiplexed light demultiplexed by the first demultiplexer; a second demultiplexer for further demultiplexing the demultiplexed light, of which the frequency is converted by the frequency converter, to a plurality of demultiplexed lights; a first multiplexer for multiplexing the demultiplexed lights demultiplexed by the first demultiplexer and has transmitted the object to be measured, and one of the demultiplexed lights demultiplexed by the second demultiplexer; a third multiplexer for multiplexing another demultiplexed light demultiplexed by the second demultiplexer, and the reflected light detected by the directional coupler; a first photoelectrical converter and a third photoelectrical converter for converting the lights multiplexed by the first multiplexer and the third multiplexer to electric signals, respectively; a referential high frequency signal source for supplying a reference high frequency signal to the frequency converter; and a phase amplitude measurement block. The conversion outputs of the first photoelectrical converter and the third photoelectrical converter are input into an amplitude and phase measurement input terminal of the phase amplitude measurement block, and the reference signal of the referential high frequency signal source is input into the reference signal input terminal of the phase amplitude measurement block.

There may be provided a second multiplexer for multiplexing one of the demultiplexed lights demultiplexed by the second demultiplexer, and the light which has passed through the directional coupler. The multiplexed light multiplexed by the second multiplexer may be converted into an electric signal by the second photoelectrical converter, and a reference signal may be acquired by the photoelectric conversion output signal.

According to a sixth aspect of the present invention, an optical network analyzer includes: a pair of cooperatively-operated wavelength variable light sources for discharging lights, frequency difference between the discharged lights being constant; a first demultiplexer and a second demultiplexer for demultiplexing the lights discharged from the pair of wavelength variable light sources to a plurality of demultiplexed lights, respectively; a first multiplexer for multiplexing one of the demultiplexed lights demultiplexed by the first demultiplexer, and the demultiplexed light which has transmitted the object to be measured; a second multiplexer for multiplexing one of the demultiplexed lights demultiplexed by the first demultiplexer, and one of the demultiplexed lights demultiplexed by the second demultiplexer; a first photoelectrical converter and a second photoelectrical converter for converting the multiplexed lights multiplexed by the first multiplexer and the second multiplexer into electric signals, respectively; and a phase amplitude measurement block. The photoelectric conversion output of the first photoelectrical converter is input into an amplitude and phase measurement input terminal of the phase amplitude measurement block, and the photoelectric conversion output of the second photoelectrical converter is input into a reference signal input terminal of the phase amplitude measurement block.

According to a seventh aspect of the present invention, an optical network analyzer includes: a wavelength variable light source; a demultiplexer for demultiplexing the light discharged from the wavelength variable light source to a plurality of demultiplexed lights; a frequency converter for converting a frequency of one of the demultiplexed light demultiplexed by the demultiplexer; a multiplexer for multiplexing the demultiplexed light, of which the frequency is converted by the frequency converter, and the demultiplexed light which has transmitted the object to be measured; a photoelectrical converter for receiving the multiplexed light multiplexed by the multiplexer and converting it into an electric signal; a reference signal generating section for supplying a reference high frequency signal to the frequency converter; a reference signal source for supplying a reference signal to the reference signal generating section; a divider for dividing a frequency of the conversion output of the photoelectrical converter; and a phase amplitude measurement block. The output of the divider for dividing the frequency of the conversion output of the photoelectrical converter is input into a phase measurement input terminal of the phase amplitude measurement block. The output of the reference signal generating section is input into a reference signal input terminal of the phase amplitude measurement block, where the output of the reference signal generating section is the reference high frequency signal of which the frequency is divided by the same ratio as the divider, and the output synchronizing with the reference high frequency signal generated in the reference signal generating section. The conversion output of the photoelectrical converter is input into a direct amplitude measurement input terminal of the phase amplitude measurement block.

According to an eighth aspect of the present invention, an optical network analyzer includes: a wavelength variable light source; a first demultiplexer for demultiplexing a light discharged from the wavelength variable light source to a plurality of demultiplexed lights; an optical waveguide for guiding one of the demultiplexed lights demultiplexed by the first demultiplexer to the object to be measured; a directional coupler, being provided in the optical waveguide, for allowing the light which has been reflected from the object to be measured to pass through the directional coupler; a frequency converter for converting a frequency of another demultiplexed light demultiplexed by the first demultiplexer; a second demultiplexer for further demultiplexing the demultiplexed light, of which the frequency is converted by the frequency converter, to a plurality of demultiplexed lights; a first multiplexer for multiplexing the demultiplexed light which has transmitted the object to be measured, and one of the demultiplexed light demultiplexed by the second demultiplexer; a third multiplexer for multiplexing another demultiplexed light demultiplexed by the second demultiplexer, and the reflected light detected by the directional coupler, a first photoelectrical converter and a third photoelectrical converter for converting the multiplexed lights multiplexed by the first multiplexer and the third multiplexer into electric signals, respectively; a reference signal generating section for supplying a reference high frequency signal to the frequency converter; two dividers for dividing the frequency of the photoelectric conversion outputs of a reference signal source, the first photoelectrical converter, and the third photoelectrical converter by the same ratio, where the reference signal source supplies a reference signal to the reference signal generating section; and a phase amplitude measurement block. The divided outputs of the dividers are input into a phase measurement input terminal of the phase amplitude measurement block. The output of the reference signal generating section is input into a reference signal input terminal of the phase amplitude measurement block, where the output of the reference signal generating section is the reference high frequency signal of which the frequency is divided by the same ratio as the divider, and the output synchronizing with the reference high frequency signal generated in the reference signal generating section. The photoelectric conversion signals output from the first photoelectrical converter and the third photoelectrical converter are input into an amplitude measurement input terminal of the phase amplitude measurement block.

According to a ninth aspect of the present invention, an optical network analyzer includes: a wavelength variable light source; a demultiplexer for demultiplexing a light discharged from the wavelength variable light source to a plurality of demultiplexed lights; a frequency converter for converting the frequency of one of the demultiplexed light demultiplexed by the demultiplexer; a multiplexer for multiplexing the demultiplexed light, of which the frequency is converted by the frequency converter, and the demultiplexed light which has transmitted the object to be measured; a photoelectrical converter for receiving the multiplexed light multiplexed by the multiplexer and converting it into an electric signal; a referential high frequency signal source for supplying a referential high frequency signal to the frequency converter; two dividers for dividing the frequency of the signal of the referential high frequency signal source and the conversion output of the photoelectrical converter by the same ratio as each other; and a phase amplitude measurement block. The output of the divider for dividing the frequency of the conversion output of the photoelectrical converter is input into a phase measurement input terminal of the phase amplitude measurement block. The output of the divider for dividing the frequency of the reference signal is input into a reference signal input terminal of the phase amplitude measurement block. The conversion output of the photoelectrical converter is input into a direct amplitude measurement input terminal of the phase amplitude measurement block.

According to a tenth aspect of the present invention, an optical network analyzer includes: a wavelength variable light source; a first demultiplexer for demultiplexing a light discharged from the wavelength variable light source to a plurality of demultiplexed lights; a frequency converter for converting frequency of one of the demultiplexed lights demultiplexed by the first demultiplexer; a second demultiplexer for further demultiplexing another demultiplexed light demultiplexed by the first demultiplexer to a plurality of demultiplexed lights; a third demultiplexer, being provided at the output of the frequency converter, for further demultiplexing the demultiplexed light, of which the frequency is converted by the frequency converter, to a plurality of demultiplexed lights; a first multiplexer for multiplexing the demultiplexed lights which has transmitted the object to be measured, and one of the demultiplexed light demultiplexed by the third demultiplexer; a second multiplexer for multiplexing another demultiplexed light demultiplexed by the second demultiplexer, and another demultiplexed light demultiplexed by the third demultiplexer; a first photoelectrical converter and a second photoelectrical converter for converting the multiplexed lights output from the first multiplexer and the second multiplexer, and acquiring a measured signal and a reference signal, separately and respectively; two dividers for dividing the photoelectric conversion outputs of the first photoelectrical converter and the second photoelectrical converter by the same ratio as each other; and a phase amplitude measurement block. The divided output of the divider for dividing the frequency of the conversion output of the first photoelectrical converter is input into a phase measurement input terminal of the phase amplitude measurement block. The divided output of the divider for dividing the frequency of the conversion output of the second photoelectrical converter, is input into a reference signal input terminal of the phase amplitude measurement block. The conversion output of the first photoelectrical converter is input into a direct amplitude measurement input terminal of the phase amplitude measurement block.

According to an eleventh aspect of the present invention, an optical network analyzer includes: a wavelength variable light source; a first demultiplexer for demultiplexing a light discharged from the wavelength variable light source to a plurality of demultiplexed lights; an optical waveguide for guiding one of the demultiplexed lights demultiplexed by the first demultiplexer to an object to be measured; a directional coupler, being provided in the optical waveguide, for allowing the light reflected from the object to be measured to pass through the directional coupler; a frequency converter for converting the frequency of another demultiplexed light demultiplexed by the first demultiplexer; a second demultiplexer for further demultiplexing the demultiplexed light, of which the frequency is converted by the frequency converter, to a plurality of demultiplexed lights; a first multiplexer for multiplexing the demultiplexed lights which has transmitted the object to be measured, and one of the demultiplexed lights demultiplexed by the second demultiplexer; a third multiplexer for multiplexing another demultiplexed light demultiplexed by the second demultiplexer, and the reflected light detected by the directional coupler, a first photoelectrical converter and a third photoelectrical converter for converting the multiplexed lights multiplexed by the first multiplexer and the third multiplexer, respectively; two dividers for dividing frequency of the photoelectric conversion outputs of the first photoelectrical converter and the third photoelectrical converter by the same ratio; and a phase amplitude measurement block. The divided outputs of the two dividers are input into a phase measurement input terminal of the phase amplitude measurement block. The divided signal, which is the referential high frequency signal supplied to the frequency converter being divided by the same ratio as the divider, is input into a reference signal input terminal of the phase amplitude measurement block. The photoelectric conversion signals output from the first photoelectrical converter and the third photoelectrical converter are input into an amplitude measurement input terminal of the phase amplitude measurement block.

The optical network analyzer may further include a second multiplexer for multiplexing one of the demultiplexed lights demultiplexed by the second demultiplexer, and the light which has passed through the directional coupler. The second photoelectrical converter may convert the multiplexed light multiplexed by the second multiplexer into an electric signal, and a reference signal may be acquired by the photoelectric conversion output signal.

According to a twelfth aspect of the present invention, an optical network analyzer includes: a pair of cooperatively-operated wavelength variable light sources for discharging lights, respectively, frequency difference between the lights being constant; a first demultiplexer and second demultiplexer for demultiplexing the lights discharged from the pair of wavelength variable light sources to a plurality of demultiplexed lights, respectively; a first multiplexer for multiplexing one of the demultiplexed lights demultiplexed by the first demultiplexer, and the demultiplexed light which has transmitted the object to be measured; a second multiplexer for multiplexing one of the demultiplexed lights demultiplexed by the first demultiplexer, and one of the demultiplexed lights demultiplexed by the second demultiplexer; a first photoelectrical converter and a second photoelectrical converter for converting the multiplexed lights multiplexed by the first multiplexer and the second multiplexer into electric signals, respectively; two dividers for dividing the photoelectric conversion outputs of the first photoelectrical converter and the second photoelectrical converter by a predetermined ratio; and a phase amplitude measurement block. The divided output of one of the dividers is input into a phase measurement signal input terminal of the phase amplitude measurement block. The divided output of another divider is input into a reference signal input terminal of the phase amplitude measurement block. The photoelectric conversion output of the first photoelectrical converter is supplied to an amplitude measurement signal input terminal of the phase amplitude measurement block.

There may be provided multipliers at each output of the photoelectrical converters and in the reference signal path. The referential high frequency signal may be applied to each of the multipliers. Frequency-converted signals may be generated at the output of the multipliers. A filter may extract the frequency-converted signal, and the signal extracted by the filter may be used as the phase measurement signal and the reference signal.

The demultiplexed lights demultiplexed by one of the demultiplexers may be multiplexed by a multiplexer, one of the lights having transmitted the object to be measured and the other light having passed through the frequency converter, and the demultiplexed lights demultiplexed by another demultiplexer may be directly multiplexed by a multiplexer. The optical path from the wavelength variable light source to the multiplexer may be an optical waveguide.

The summary of the invention does not necessarily describe all necessary features of the present invention. The present invention may also be a sub-combination of the features described above.

DETAILED DESCRIPTION OF THE INVENTION

The invention will now be described based on the preferred embodiment, which does not intend to limit the scope of the present invention, but exemplify the invention. All of the features and the combinations thereof described in the embodiment are not necessarily essential to the invention.

Figure 1:
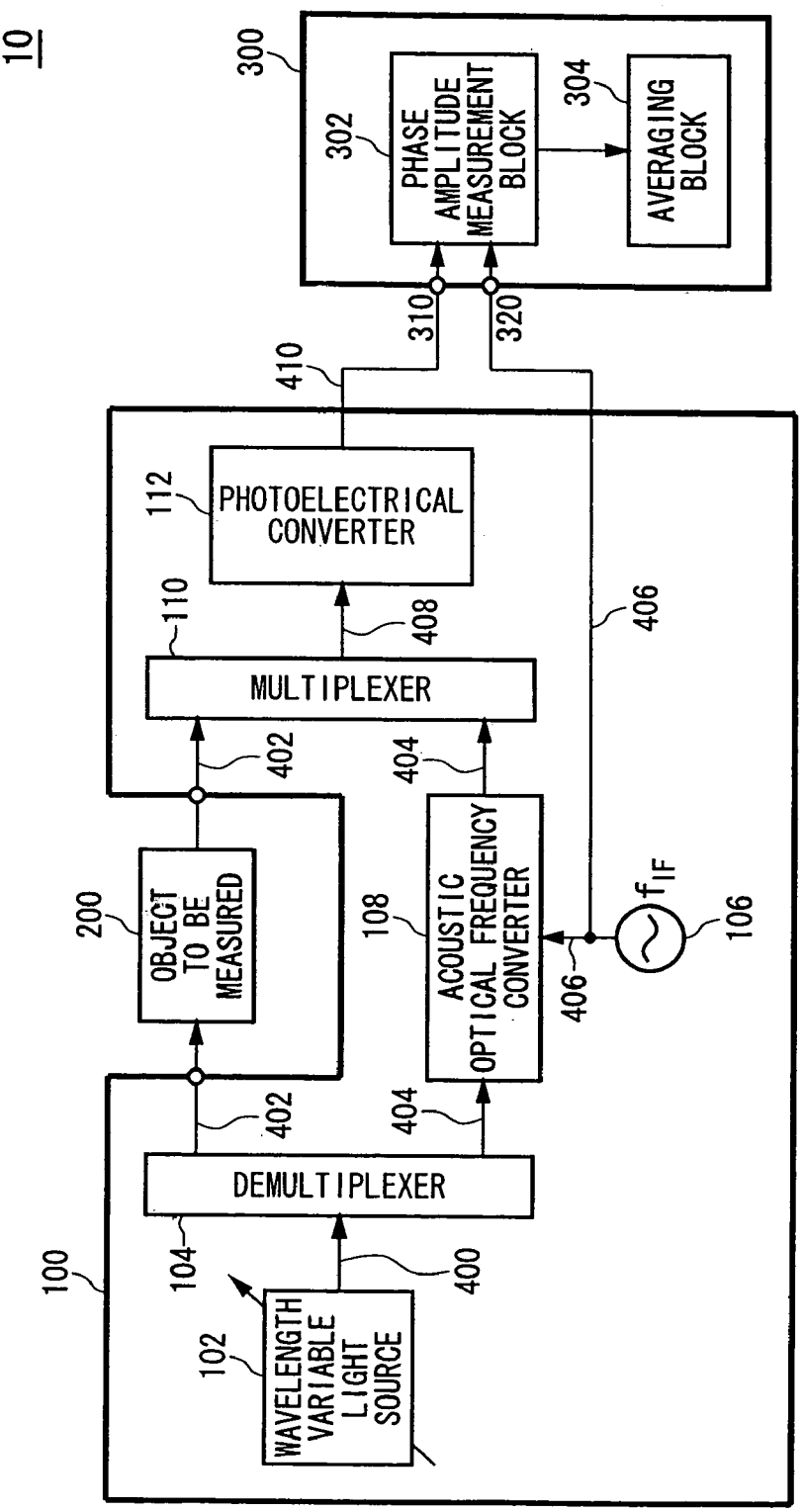
FIG. 1 is a block diagram of an optical network analyzer 10 according to a first embodiment of an embodiment of the present invention.

FIG. 1 is a block diagram showing a configuration of an optical network analyzer 10 according to a first embodiment of an embodiment of the present invention. The optical network analyzer 10 includes an optical measurement section 100, an object to be measured 200, and a network analyzer 300. The optical-measurement section 100 according to the first embodiment includes a wavelength variable light source 102, a demultiplexer 104, a referential high frequency signal source 106, an acoustic optical frequency converter 108, a multiplexer 110, and a photoelectrical converter 112. Moreover, the network analyzer 300 includes a phase amplitude measurement block 302 and an averaging block 304.

The wavelength variable light source 102 generates an optical signal 400. Then, the demultiplexer 104 demultiplexes the optical signal 400 generated by the wavelength variable light source 102, and outputs an optical signal 402 and an optical signal 404. Then, the acoustic optical frequency converter 108 converts the frequency of the optical signal 404 based on a reference signal 406 generated by the referential high frequency signal source 106. The optical signal 402 transmits the object to be measured 200, and is input into the multiplexer 110. The acoustic optical frequency converter 108 converts the frequency of the optical signal 404, and the optical signal 404 is input into the multiplexer 110.

Next, the multiplexer 110 multiplexes the optical signal 402 which has transmitted the object to be measured 200, and the optical signal 404 having a frequency different from the optical signal 402, and outputs an optical signal 408. Then, the photoelectrical converter 112 receives the optical signal 408 output from the multiplexer 110, and converts the optical signal 408 into an electric signal 410.

The phase amplitude measurement block 302 receives the electric signal 410 output from the photoelectrical converter 112 through a transmission measurement input terminal 310, and receives a reference signal 406 generated by the referential high frequency signal source 106 through a reference signal input terminal 320. Then, the phase amplitude measurement block 302 compares the phases of the electric signal 410 and the reference signal 406, and measures the wavelength dependence of phase characteristic, such as propagation delay (group delay) time of the light which has transmitted the object to be measured 200. Moreover, the phase amplitude measurement block 302 measures the wavelength dependence of the amplitude of the optical signal 402 which has transmitted the object to be measured 200 (transmission attenuation) based on the electric signal 410. Then, the averaging block 304 calculates average of the values measured by the phase amplitude measurement block 302.

In addition, it is preferable that the optical paths from the wavelength variable light source 102 to the photoelectrical converter 112 are optical waveguides, i.e., optical fibers. It is also preferable that the multiplexer 110 multiplexes the optical signal 402 and the optical signal 404 so that the planes of polarization of the optical signals are aligned with each other. It is also preferable that the demultiplexer 104 and the multiplexer 110 are assembled on an optical-integrated-circuit substrate. Alternatively, the acoustic optical frequency converter 108 is an acousto-optic modulator (AOM) or an acousto-optic shifter (AOS). Alternatively, the optical measurement section 100 includes an electro optics frequency shifter using an electro optics crystal, or a frequency shifter using electro optics liquid crystal, substituting for the acoustic optical frequency converter 108.

Operation of the optical network analyzer 10 according to the first embodiment will be explained hereinafter using following equations. The wavelength variable light source 102 generates the coherent light (optical signal 400) of wavelength λ and angular frequency $\omega_c$, and the acoustic optical frequency converter 108 converts the angular frequency of the optical signal 400 into $\omega_c+P$.

The electric field $e_1(t)$ of the optical signal 402 before being applied to the object to be measured 200 is expressed by the following equation.

$$e_1(t)=A_1 \cos \omega_c t$$

The electric field $e_2(t)$ of the optical signal 404 of which the frequency is converted by the acoustic optical frequency converter 108 is expressed by the following equation.

$$e_2(t)=A_2 \cos \{(\omega_c+P)t+\theta_2\}$$

The transfer function of the object to be measured is expressed by the following equation.

$$Y(\omega_c)=Y_o \exp(j\phi_o)$$

Thereby, The electric field $e_d$ of the optical signal 408 being incidence on the photoelectrical converter 112 is expressed by the following equation.

$$e_d=Y(\omega_c)A_1 \cos \omega_c t+A_2 \cos \{(\omega_c P)t+\theta_2\}$$

The output current $i_d$ of the photoelectrical converter 112 is expressed by the following equation.

$$i_d=\alpha\{Y_o^2 A_1^2+A_2^2+2Y_o A_1 A_2 \cos (Pt+\theta_2-\phi_o)\}$$

Where, phase $\phi_o$, angular frequency $\omega_c$, and propagation delay time $\tau(\omega_c)$ have the relation expressed by the following equation.

$$\tau(\omega_c)=\phi_o/\omega_c$$

Moreover, since the angular frequency ωc is known, the phase amplitude measurement block 302 measures the wavelength dependence of the transmission attenuation and the phase characteristic, such as the propagation delay time, of the object to be measured 200 by measuring the phase and amplitude of the electric signal 410 received from the photoelectrical converter 112 and comparing them with the reference signal 406.

Figure 2:
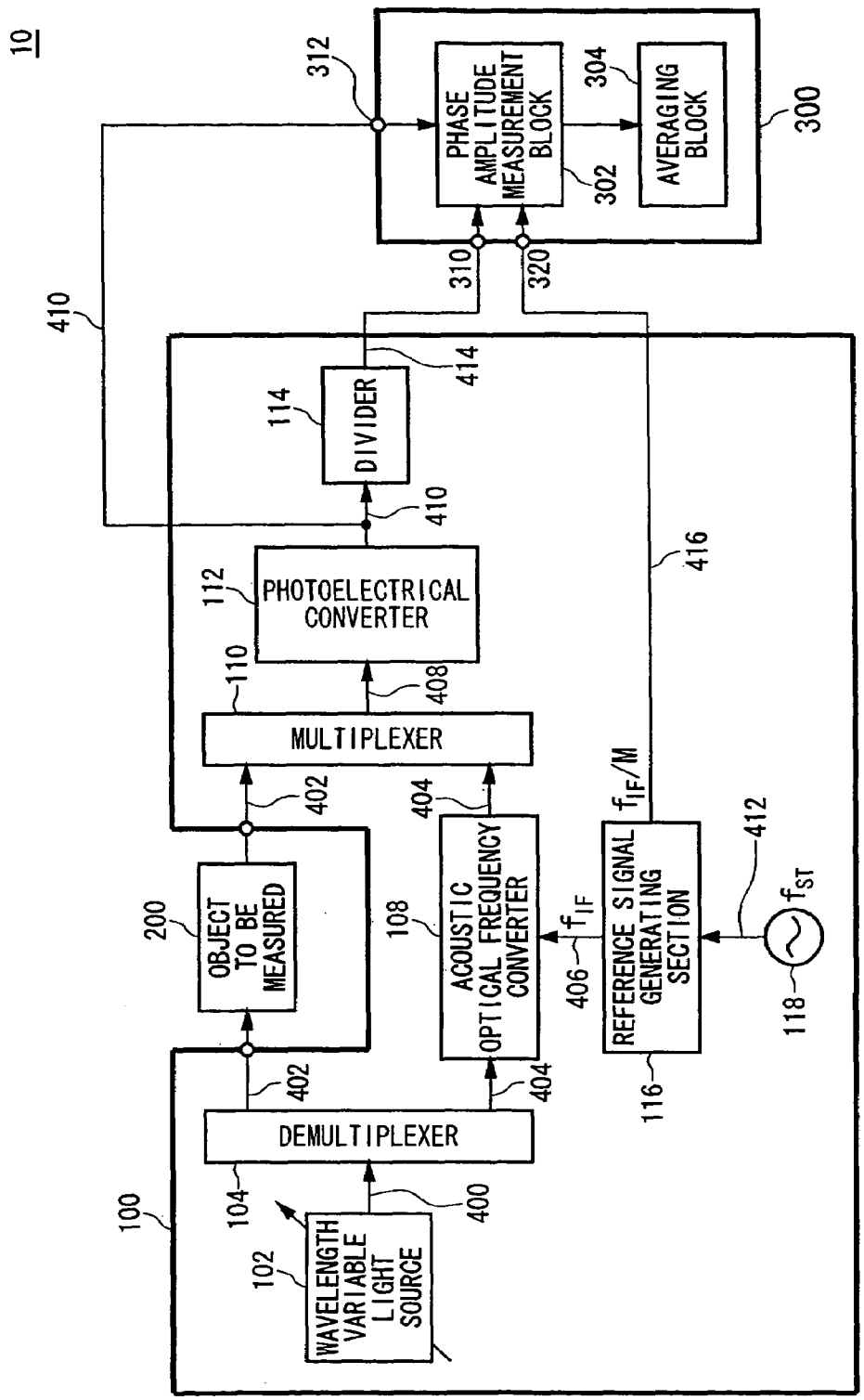
FIG. 2 is a block diagram of the optical network analyzer 10 according to a second embodiment.

Where,
- A1, A2: amplitude of the electric field
- P: angular frequency of modulation
- $\theta_2$: constant phase
- $\omega_c$: angular frequency
- $\alpha$: proportionality coefficient FIG. 2 is a block diagram of a configuration of the optical network analyzer 10 according to a second embodiment of the present embodiment. In the second embodiment, the component similar to that of the optical network analyzer 10 according to the above-described embodiment bears the same reference numeral as that of the above-mentioned embodiment. Moreover, in the second embodiment, explanation about the same configuration and operation as the above-described embodiment will be partially omitted, and configuration and operation different from the above-described embodiment will be explained in particular.

In addition to the component of the optical measurement section 100 according to the first embodiment, the optical measurement section 100 according to the second embodiment includes a divider 114. Moreover, the optical measurement section 100 according to the second embodiment includes a reference signal generating section 116 and a reference signal source 118 instead of the referential high frequency signal source 106 of the optical measurement section 100 according to the first embodiment.

The wavelength variable light source 102 generates the optical signal 400. Then, the demultiplexer 104 demultiplexes the optical signal 400 generated by the wavelength variable light source 102, and outputs the optical signal 402 and the optical signal 404. The reference signal generating section 116 generates the reference signal 406 based on a reference signal 412 generated by the reference signal source 118. Moreover, the reference signal generating section 116 generates a reference signal 416 synchronizing with the reference signal 406, and frequency-divided by a division ratio M, which is the same as a division ratio of the divider 114. Then, the acoustic optical frequency converter 108 converts the frequency of the optical signal 404 based on the reference signal 406 generated by the reference signal generating section 116. The optical signal 402 transmits the object to be measured 200, and is input into the multiplexer 110. The acoustic optical frequency converter 108 converts the frequency of the optical signal 404, and the converted optical signal 404 is input into the multiplexer 110.

Next, the multiplexer 110 multiplexes the optical signal 402 which has transmitted the object to be measured 200, and the optical signal 404 having a frequency different from the optical signal 402, and outputs the optical signal 408. Then, the photoelectrical converter 112 receives the optical signal 408 output from the multiplexer 110, and converts the optical signal 408 into the electric signal 410. Then, the divider 114 divides the frequency of the electric signal 410 by the division ratio M, and outputs an electric signal 414.

The phase amplitude measurement block 302 receives the electric signal 414 output from the divider 114 through the transmission phase measurement input terminal 310, and receives the reference signal 416 generated by the reference signal generating section 116 through the reference signal input terminal 320. Then, the phase amplitude measurement block 302 compares the phases of the electric signal 414 and the reference signal 416, and measures the wavelength dependence of the phase characteristic, such as a propagation delay time of the light which has transmitted the object to be measured 200. Moreover, the phase amplitude measurement block 302 receives the electric signal 410 output from the photoelectrical converter 112 through a transmission amplitude measurement input terminal 312. Then, the phase amplitude measurement block 302 measures the wavelength dependence of the amplitude of the optical signal 402 which has transmitted the object to be measured 200 (transmission attenuation) based on the electric signal 410. Then, the averaging block 304 calculates average of the values which are measured by the phase amplitude measurement block 302.

It is preferable that the reference signal generating section 116 consists of a phase locked loop (PLL) circuit or a multiplier based on the reference signal 412 generated by the reference signal source 118, or a direct digital synthesizer (DDS) When the frequency of the reference signal 412 of the reference signal source 118 is $f_{st}$, frequency $f_{IF}$ of the reference signal 406 input into the acoustic optical frequency converter 108 is expressed by the following equation.

$$f_{IF}=NMf_{st}$$

Where, N and M are positive integers.

Frequency $f_{Ref}$ of the reference signal 416 input into the reference signal input terminal 320 of the network analyzer 300 is expressed by the following equation.

$$f_{Ref}=Nf_{st}$$

Furthermore, the reference signal 406 and the reference signal 416 are synchronized with each other.

As described above, phase $\phi_o$, angular frequency $\omega_c$, and propagation delay time $\tau(\omega_c)$ of the electric signal 410 output from the photoelectrical converter 112 have the relation expressed by the following equation.

$$\tau(\omega_c)=\phi_o/\omega_c$$

Here, when the wavelength of light is set to 1.5 micrometers, the propagation delay time $\tau$ when the phase $\phi_o$ rotates 180 degrees becomes 2.5 femtoseconds, and the phase amplitude measurement block 302 can measure only variation of the propagation delay time of less than ±2.5 femtoseconds (in an usual phase comparator, phase cannot be measured correctly when the phase rotates ±180 degrees or more, i.e., rotates one revolution or more). Therefore, by the divider 114 of the division ratio M dividing the frequency of the electric signal 410 output from the photoelectrical converter 112 by M and outputting the electric signal 414, phase $\phi_M$ of the electric signal 414 input into the phase amplitude measurement block 302 and phase $\phi_o$ of the electric signal 410 have the relation expressed by the following equation.

$$\phi_M=\phi_o/M$$

Therefore, the phase amplitude measurement block 302 can measure variation of the propagation delay time within $\pm 2.5 \times 10^{-3}$M picoseconds. Moreover, since fluctuation and minute time variation of the light-measurement system are averaged by the frequency-dividing by the divider 114, reproducibility of the measurement increases. By using the above-described relation, the phase of the electric signal 410 is easily calculated from the phase of the electric signal 414 measured by the phase amplitude measurement block 302. Moreover, the delay time $\tau=M\phi_M/(2\pi f_{IF})$, which is calculated from the phase $\phi_M$ of the electric signal 414 and frequency $f_{IF}/M$ of the reference signal 416, is equivalent to the propagation delay time of the object to be measured 200. Therefore, the wavelength dependence of the phase characteristic, such as the propagation delay time of the light which has transmitted the object to be measured 200, is finally measurable.

Alternatively, the optical network analyzer 10 according to the second embodiment further includes a band-pass filter (center frequency $f_{IF}$) between the photoelectrical converter 112 and the divider 114. Thereby, excessive electric-signal $2f_{IF}$, being different from $f_{IF}$ included in the electric signal 410, is filtered, which allows more precise measurement.

Since the optical network analyzer 10 according to the second embodiment includes the divider 114 for dividing the frequency of the electric signal 410 output from the photoelectrical converter 112 by M and cycle of the electric signal 414 measured by the phase amplitude measurement block 302 is magnified M times, shift of the phase of the electric signal 414 is stably measurable.

Figure 3:
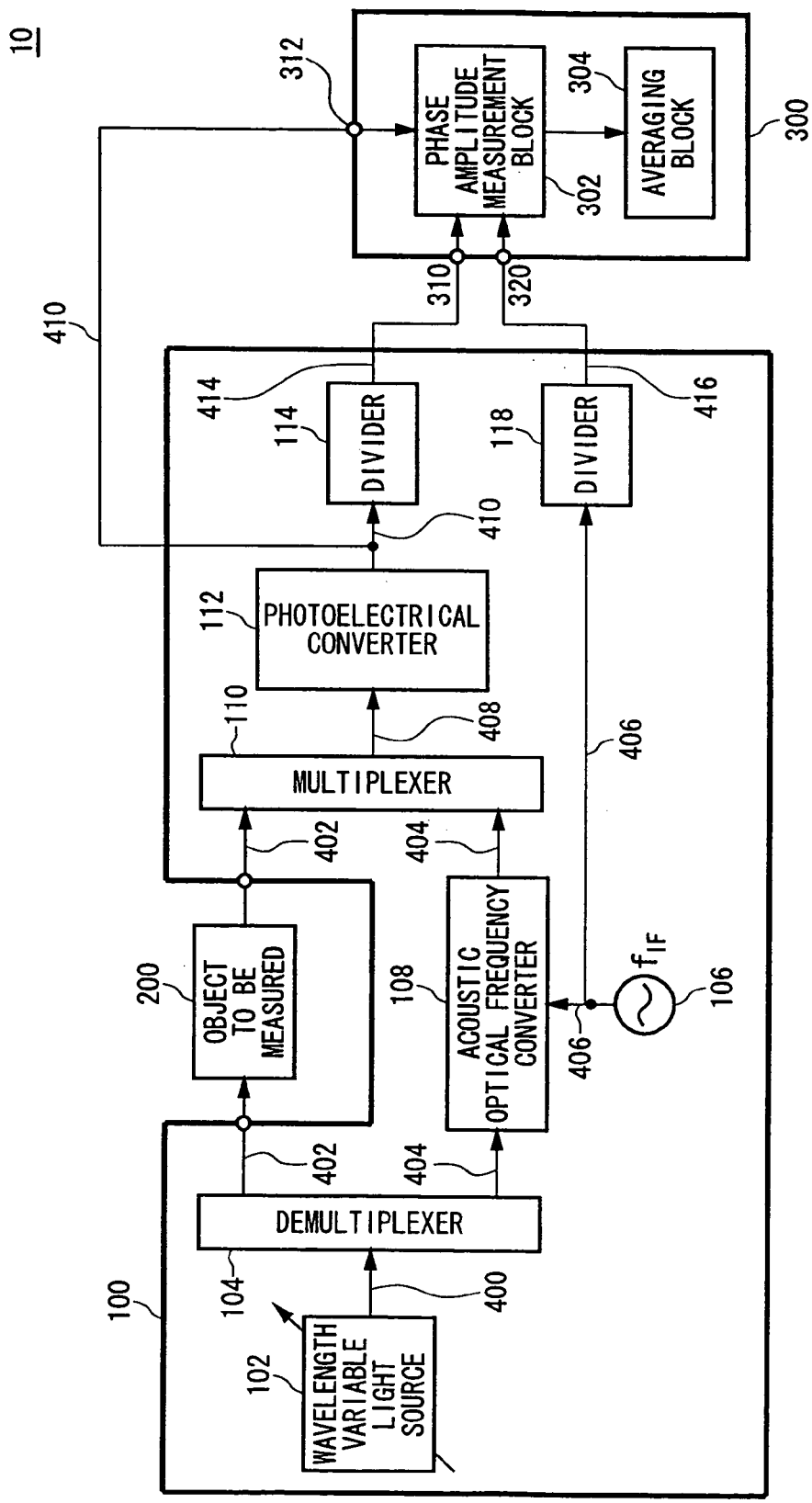
FIG. 3 is a block diagram of the optical network analyzer 10 according to a third embodiment.

FIG. 3 is a block diagram of a configuration of the optical network analyzer 10 according to a third embodiment of the present embodiment. In the third embodiment, the component similar to that of the optical network analyzer 10 according to the above-described embodiments bears the same reference numeral as that of the above-mentioned embodiments. Moreover, in the third embodiment, explanation about the same configuration and operation as the above-described embodiments will be partially omitted, and configuration and operation different from the above-described embodiments will be explained in particular.

In addition to the components of the optical measurement section 100 according to the first embodiment, the optical measurement section 100 according to the third embodiment includes a divider 114 and a divider 118.

The divider 114 divides the frequency of the electric signal 410 output from the photoelectrical converter 112 by the division ratio M, and outputs the electric signal 414. Moreover, the divider 118 divides the frequency of the reference signal 406 generated by the referential high frequency signal source 106 by the same division ratio M as the divider 114, and outputs the reference signal 416.

The phase amplitude measurement block 302 receives the electric signal 414 output from the divider 114 through the transmission phase measurement input terminal 310, and receives the reference signal 416, of which the frequency is divided by the divider 118, through the reference signal input terminal 320. Then, the phase amplitude measurement block 302 compares the phases of the electric signal 414 and the reference signal 416, and measures the wavelength dependence of the phase characteristic, such as the propagation delay time of the light which has transmitted the object to be measured 200. Moreover, the phase amplitude measurement block 302 receives the electric signal 410 output from the photoelectrical converter 112 through the transmission amplitude measurement input terminal 312. Then, the phase amplitude measurement block 302 measures the wavelength dependence of the amplitude of the optical signal 402 which has transmitted the object to be measured 200 (transmission attenuation) based on the electric signal 410. Then, the averaging block 304 calculates average of the values which are measured by the phase amplitude measurement block 302.

Since the optical network analyzer 10 according to the third embodiment includes the divider 114 for dividing the frequency of the electric signal 410 output from the photoelectrical converter 112 by M and the divider 118 for dividing the frequency of the reference signal 406 generated by the referential high frequency signal source 106 by M and each of the cycle of the electric signal 414 and cycle of the reference signal 416, which is measured by the phase amplitude measurement block 302, is magnified M times, shift of the phase of the electric signal 414 is stably measurable.

Figure 4:
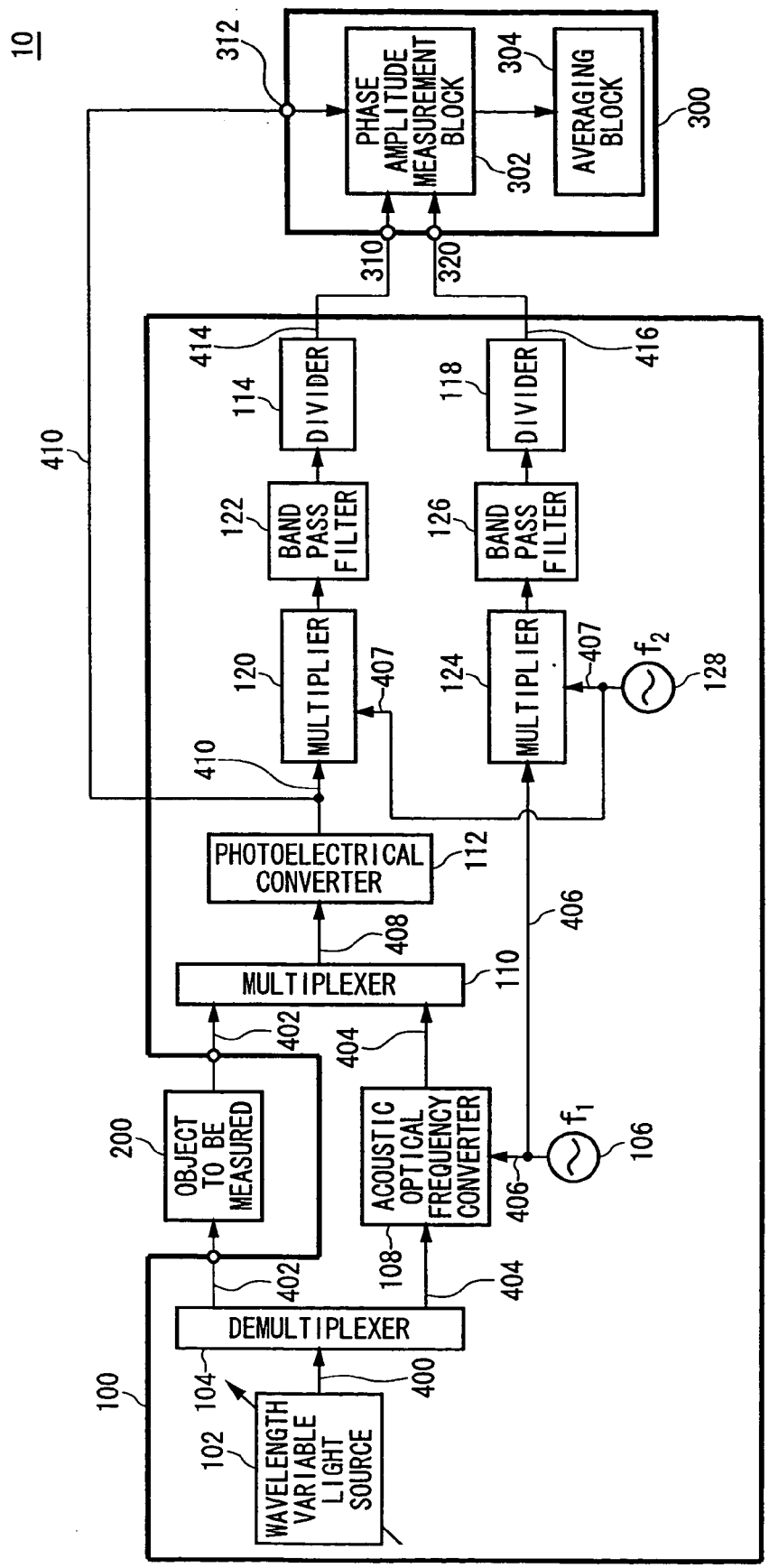
FIG. 4 is a block diagram of the optical network analyzer 10 according to a fourth embodiment.

FIG. 4 is a block diagram of a configuration of the optical network analyzer 10 according to a fourth embodiment of the present embodiment. In the fourth embodiment, the component similar to that of the optical network analyzer 10 according to the above-described embodiments bears the same reference numeral as that of the above-mentioned embodiments. Moreover, in the fourth embodiment, explanation about the same configuration and operation as the above-described embodiments will be partially omitted, and configuration and operation different from the above-described embodiments will be explained in particular.

In addition to the components of the optical measurement section 100 according to the third embodiment, the optical measurement section 100 according to the fourth embodiment includes a multiplier 120, a band pass filter 122, a multiplier 124, a band pass filter 126, and a referential high frequency signal source 128.

The multiplier 120 converts the frequency of the electric signal 410 output from the photoelectrical converter 112 based on the reference signal 407 generated by the referential high frequency signal source 128. Then, the band pass filter 122 passes a predetermined frequency component of the electric signal 410, of which the frequency is converted by the multiplier 120. Then, the divider 114 divides the frequency of the electric signal 410, which has passed the band pass filter 122, by the division ratio M, and outputs the electric signal 414. Moreover, the multiplier 124 converts the frequency of the reference signal 406 generated by the referential high frequency signal source 106 based on the reference signal 407 generated by the referential high frequency signal source 128. Then, the band pass filter 126 passes a predetermined frequency component of the reference signal 406, of which the frequency is converted by the multiplier 124. Then, the divider 118 divides the frequency of the reference signal 406 which has passed the band pass filter 126 by the same division ratio M as the divider 114, and outputs the reference signal 416. It is preferable that the frequency of the reference signal 407 generated by the referential high frequency signal source 128 is higher than that of the reference signal 406 generated by the referential high frequency signal source 106.

According to the optical network analyzer 10 of the fourth embodiment, the frequency of the electric signal 410 and the frequency of the reference signal 406 are converted into higher frequency by the multiplier 120 and the multiplier 124 multiplying the reference signal 407 generated by the referential high frequency signal source 128 with the electric signal 410 and the reference signal 406, respectively. Therefore, the frequency of the electric signal 410 and the reference signal 406, which are lowered by being divided by the divider 114 and the divider 118, are compensated and phases of the electric signal 410 and the reference signal 406 are compared at the higher frequency. Therefore, the number of times for performing the phase comparison during a predetermined time increases, and accuracy of the phase measurement also increases. In addition, the configuration including the multiplier 120, the band pass filter 122, the multiplier 124, the band pass filter 126, and the referential high frequency signal source 128 may be employed in all other embodiments.

Figure 5:
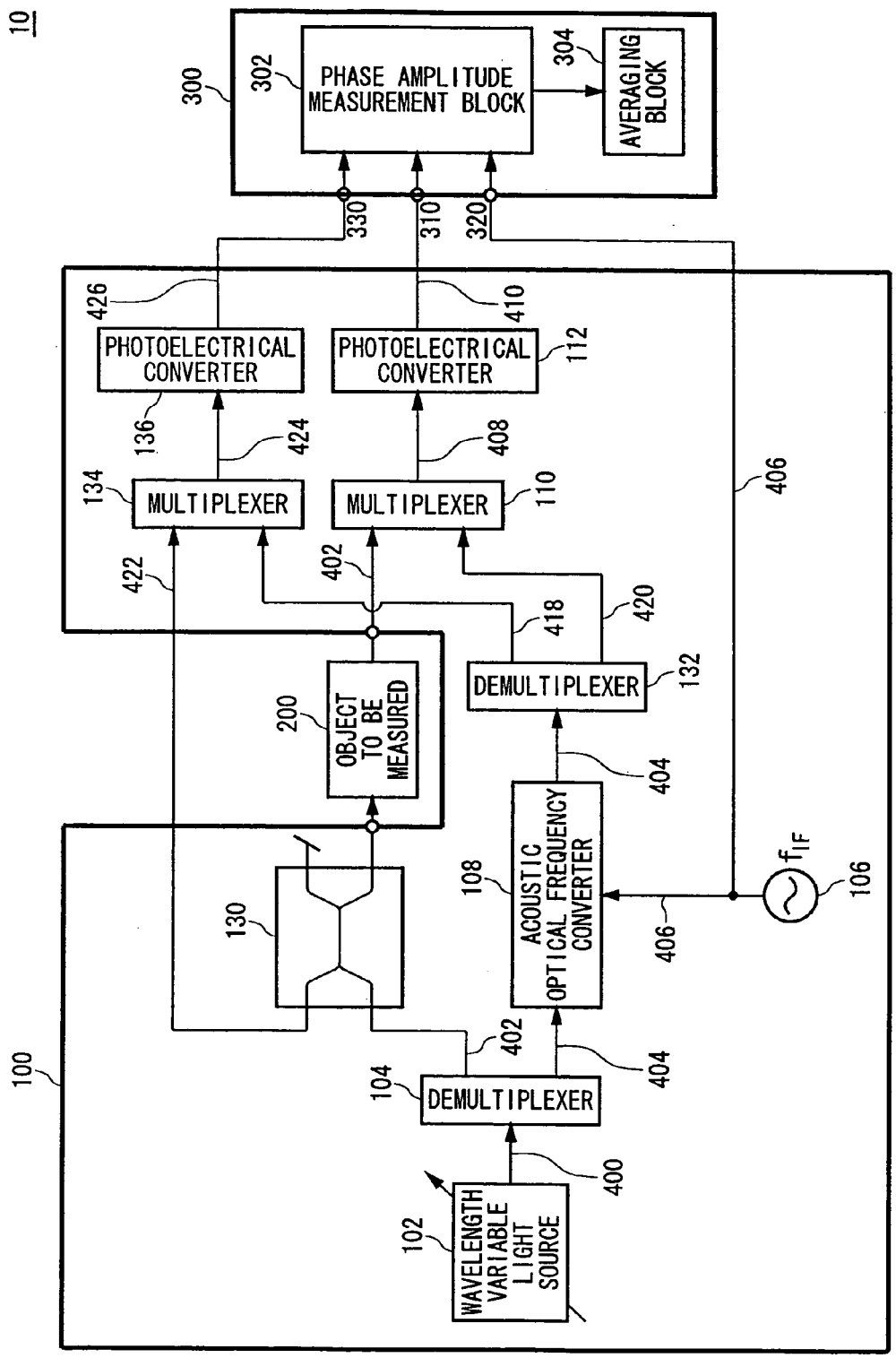
FIG. 5 is a block diagram of the optical network analyzer 10 according to a fifth embodiment.

FIG. 5 is a block diagram of a configuration of the optical network analyzer 10 according to a fifth embodiment of the present embodiment. In the fifth embodiment, the component similar to that of the optical network analyzer 10 according to the above-described embodiments bears the same reference numeral as that of the above-mentioned embodiments. Moreover, in the fifth embodiment, explanation about the same configuration and operation as the above-described embodiments will be partially omitted, and configuration and operation different from the above-described embodiments will be explained in particular.

In addition to the components of the optical measurement section 100 according to the first embodiment, the optical measurement section 100 according to the fifth embodiment includes a directional coupler 130, a demultiplexer 132, a multiplexer 134, and a photoelectrical converter 136.

The wavelength variable light source 102 generates the optical signal 400. Then, the demultiplexer 104 demultiplexes the optical signal 400 generated by the wavelength variable light source 102, and outputs the optical signal 402 and the optical signal 404. Then, the optical signal 402 passes through the directional coupler 130 and is incidence on the object to be measured 200, and the directional coupler 130 allows an optical signal 422, which has been reflected from the object to be measured 200, to pass through it. Moreover, the acoustic optical frequency converter 108 converts the frequency of the optical signal 404 based on the reference signal 406 generated by the referential high frequency signal source 106. Then, the demultiplexer 132 demultiplexes the optical signal 404, of which the frequency is converted by the acoustic optical frequency converter 108, and outputs an optical signal 418 and an optical signal 420. The optical signal 402 transmits the object to be measured 200, and is input into the multiplexer 110. The optical signal 422 is output from the direction coupler 130, and input into the multiplexer 134. The optical signal 418 is output from the demultiplexer 132, and input into the multiplexer 134. The optical signal 420 is output from the demultiplexer 132, and input into the multiplexer 110.

Next, the multiplexer 110 multiplexes the optical signal 402 which has transmitted the object to be measured 200, and the optical signal 420 having a frequency different from the optical signal 402, and outputs the optical signal 408. Then, the photoelectrical converter 112 receives the optical signal 408 output from the multiplexer 110, and converts the optical signal 408 into the electric signal 410. The multiplexer 134 multiplexes the optical signal 422 reflected from the object to be measured 200, and the optical signal 418 having a frequency different from the optical signal 422, and outputs an optical signal 424. Then, the photoelectrical converter 136 receives the optical signal 424 output from the multiplexer 134, and converts the optical signal 424 into an electric signal 426.

The phase amplitude measurement block 302 receives the electric signal 410 output from the photoelectrical converter 112 through the transmission measurement input terminal 310, receives the electric signal 426 output from the photoelectrical converter 136 through a reflective measurement input terminal 330, and receives the reference signal 406 generated by the referential high frequency signal source 106 through the reference signal input terminal 320. Then, the phase amplitude measurement block 302 compares the phases of the electric signal 410 and the reference signal 406, and measures the wavelength dependence of the phase characteristic, such as the propagation delay time of the light which has transmitted the object to be measured 200. Moreover, the phase amplitude measurement block 302 compares the phases of the electric signal 426 and the reference signal 406, and measures the phase characteristic of the optical signal 422, i.e., the light reflected from the object to be measured 200. Moreover, the phase amplitude measurement block 302 measures the wavelength dependence of the amplitude of the optical signal 402 which has transmitted the object to be measured 200 (transmission attenuation) based on the electric signal 410. Moreover, the phase amplitude measurement block 302 measures the amplitude of the optical signal 422 reflected from the object to be measured 200 (reflective amplitude) based on the electric signal 426. Then, the averaging block 304 calculates average of the values which are measured by the phase amplitude measurement block 302.

According to the optical network analyzer 10 of the fifth embodiment, since the optical measurement section 100 includes the directional coupler 130 from which the light reflected from the object to be measured 200 is output, and since the network analyzer 300 includes the reflective measurement signal input terminal 330 for the reflected light in addition to the transmission measurement signal input terminal 310 for the transmitted light, the amplitude characteristic and the phase characteristic of the reflected light other than the amplitude characteristic and the phase characteristic of the transmitted light are measurable.

Figure 6:
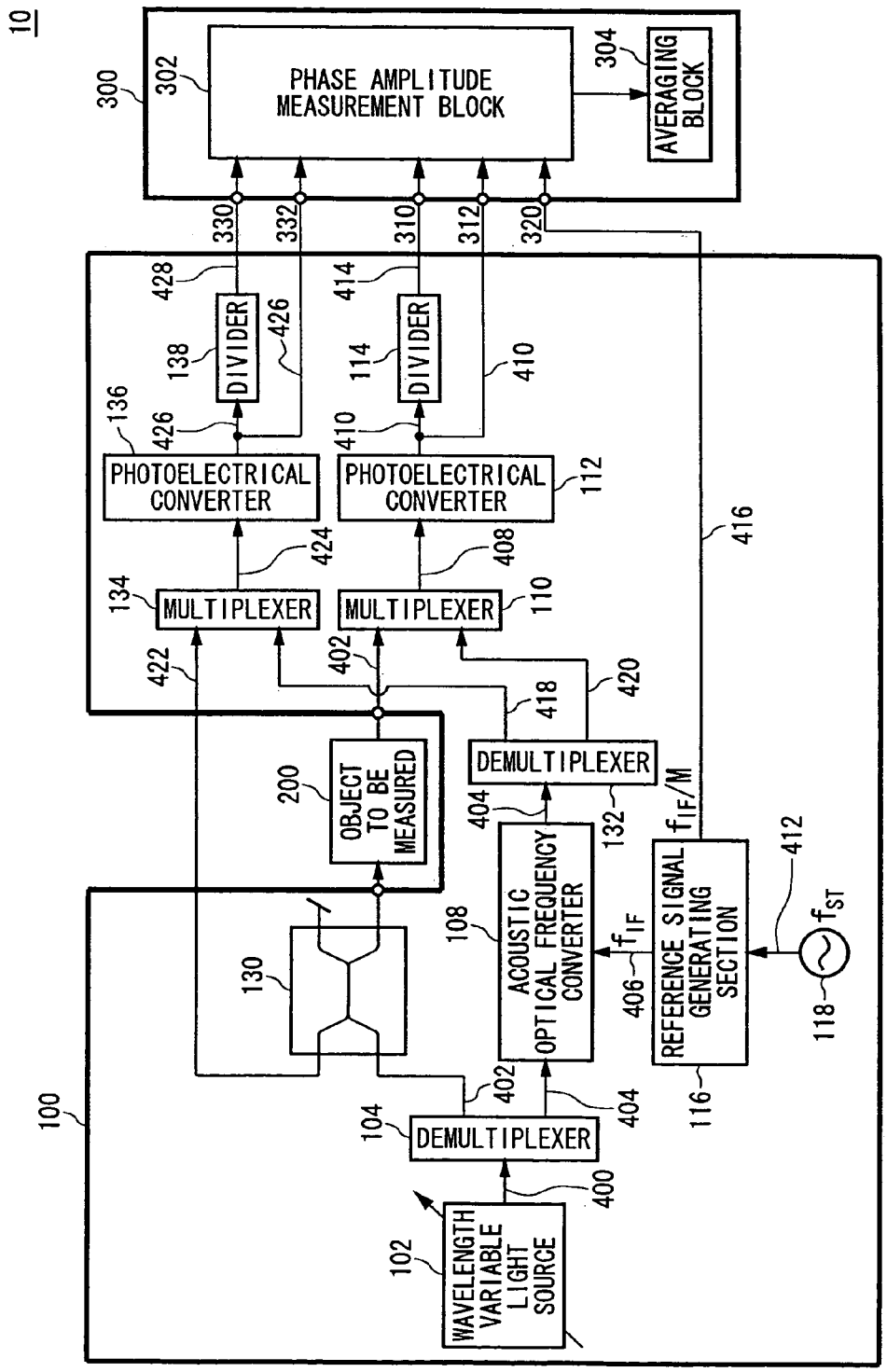
FIG. 6 is a block diagram of the optical network analyzer 10 according to a sixth embodiment.

FIG. 6 is a block diagram of a configuration of the optical network analyzer 10 according to a sixth embodiment of the present embodiment. In the sixth embodiment, the component similar to that of the optical network analyzer 10 according to the above-described embodiments bears the same reference numeral as that of the above-mentioned embodiments. Moreover, in the sixth embodiment, explanation about the same configuration and operation as the above-described embodiments will be partially omitted, and configuration and operation different from the above-described embodiments will be explained in particular.

In addition to the components of the optical measurement section 100 according to the fifth embodiment, the optical measurement section 100 according to the sixth embodiment includes a divider 114 and a divider 138. Moreover, the optical measurement section 100 according to the sixth embodiment includes a reference signal generating section 116 and a reference signal source 118 substituting for the referential high frequency signal source 106 of the optical measurement section 100 according to the fifth embodiment.

The wavelength variable light source 102 generates the optical signal 400. Then, the demultiplexer 104 demultiplexes the optical signal 400 generated by the wavelength variable light source 102, and outputs the optical signal 402 and the optical signal 404. Then, the optical signal 402 passes through the directional coupler 130 and is incidence on the object to be measured 200, and the directional coupler 130 allows the optical signal 422, which has been reflected from the object to be measured 200, to pass through it. Moreover, the reference signal generating section 116 generates the reference signal 406 based on the reference signal 412 generated by the reference signal source 118. Moreover, the reference signal generating section 116 generates the reference signal 416 synchronizing with the reference signal 406, and frequency-divided by a division ratio M, which is the same as the division ratio of the divider 114 and the divider 138. Then, the acoustic optical frequency converter 108 converts the frequency of the optical signal 404 based on the reference signal 406 generated by the reference signal generating section 116. Then, the demultiplexer 132 demultiplexes the optical signal 404, of which the frequency is converted by the acoustic optical frequency converter 108, and outputs the optical signal 418 and the optical signal 420. The optical signal 402 transmits the object to be measured 200, and is input into the multiplexer 110. The optical signal 422 is output from the direction coupler 130, and input into the multiplexer 134. The optical signal 418 is output from the demultiplexer 132, and input into the multiplexer 134.

The optical signal 420 is output from the demultiplexer 132, and input into the multiplexer 110.

Next, the multiplexer 110 multiplexes the optical signal 402 which has transmitted the object to be measured 200, and the optical signal 420 having a frequency different from the optical signal 402, and outputs the optical signal 408. Then, the photoelectrical converter 112 receives the optical signal 408 output from the multiplexer 110, and converts the optical signal 408 into the electric signal 410. Then, the divider 114 divides the frequency of the electric signal 410 by the division ratio M, and outputs the electric signal 414. The multiplexer 134 multiplexes the optical signal 422 reflected from the object to be measured 200, and the optical signal 418 having a frequency different from the optical signal 422, and outputs the optical signal 424. Then, the photoelectrical converter 136 receives the optical signal 424 output from the multiplexer 134, and converts the optical signal 424 into the electric signal 426. Then, the divider 138 divides the frequency of the electric signal 426 by the same division ratio M as the divider 114, and outputs an electric signal 428.

The phase amplitude measurement block 302 receives the electric signal 414 output from the divider 114 through the transmission phase measurement input terminal 310, receives the electric signal 428 output from the divider 138 through the reflective phase measurement input terminal 330, and receives the reference signal 416 generated by the reference signal generating section 116 through the reference signal input terminal 320. Then, the phase amplitude measurement block 302 compares the phases of the electric signal 414 and the reference signal 416, and measures the wavelength dependence of the phase characteristic, such as the propagation delay time of the light which has transmitted the object to be measured 200. Moreover, the phase amplitude measurement block 302 compares the phases of the electric signal 428 and the reference signal 416, and measures the phase characteristic of the optical signal 422, i.e., the light reflected from the object to be measured 200. Moreover, the phase amplitude measurement block 302 receives the electric signal 410 output from the photoelectrical converter 112 through the transmission amplitude measurement input terminal 312, and receives the electric signal 426 output from the photoelectrical converter 136 through a reflective amplitude measurement input terminal 332. Then, the phase amplitude measurement block 302 measures the wavelength dependence of the amplitude of the optical signal 402 which has transmitted the object to be measured 200 (transmission attenuation) based on the electric signal 410. Moreover, the phase amplitude measurement block 302 measures the amplitude of the optical signal 422 reflected from the object to be measured 200 (reflective amplitude) based on an electric signal 426.

According to the optical network analyzer 10 of the sixth embodiment, since the cycle of each of the electric signal 414 and the electric signal 428 measured by the phase amplitude measurement block 302 is magnified M times by including the divider 114 for dividing the frequency of the electric signal 410 output from the photoelectrical converter 112 by M, and the divider 138 for dividing the frequency of the electric signal 426 output from the photoelectrical converter 136 by M, the shift of the phase of each of the electric signal 414 and the electric signal 428 is stably measurable.

Figure 7:
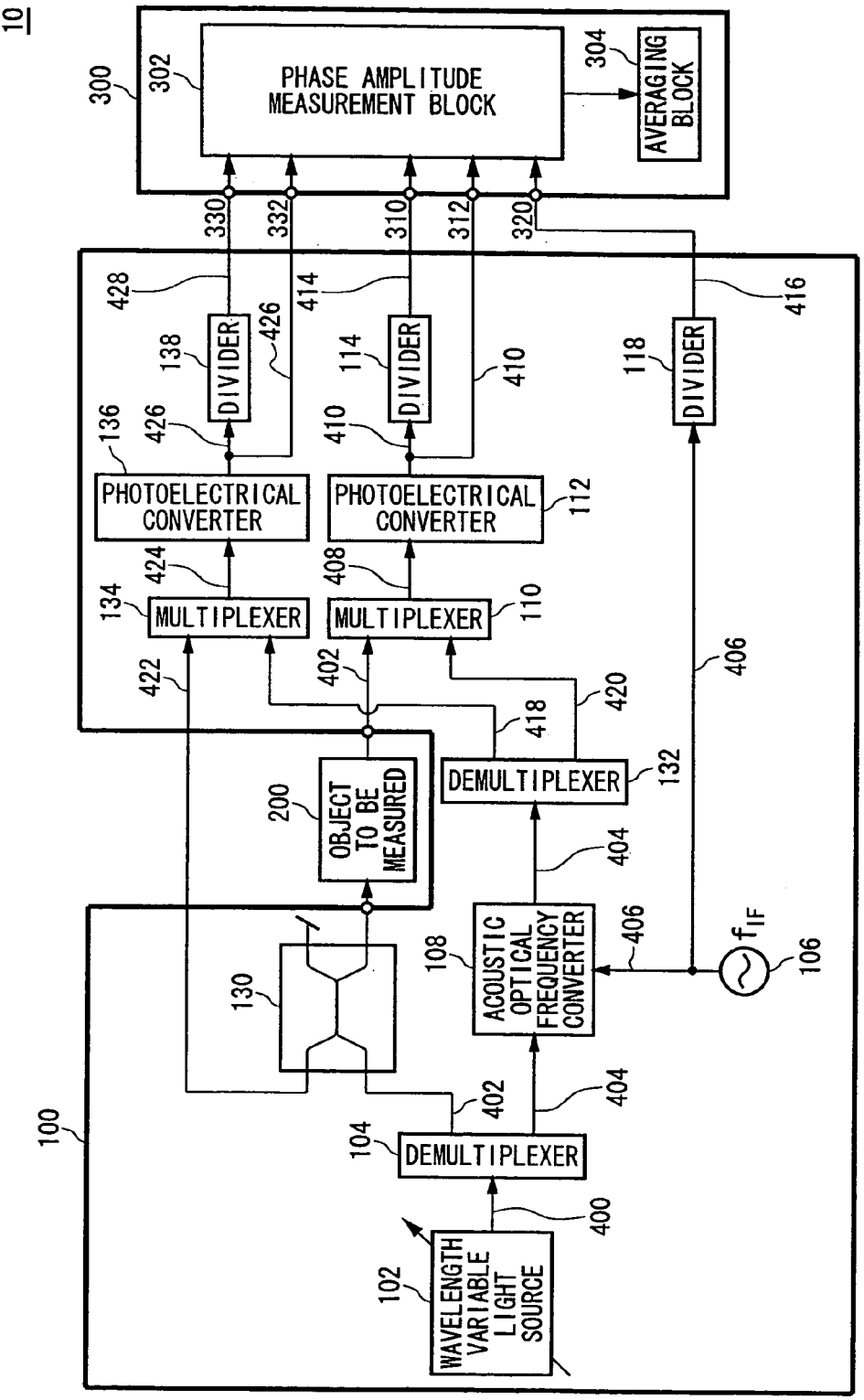
FIG. 7 is a block diagram of the optical network analyzer 10 according to a seventh embodiment.

FIG. 7 is a block diagram of a configuration of the optical network analyzer 10 according to a seventh embodiment of the present embodiment. In the seventh embodiment, the component similar to that of the optical network analyzer 10 according to the above-described embodiments bears the same reference numeral as that of the above-mentioned embodiments. Moreover, in the third embodiment, explanation about the same configuration and operation as the above-described embodiments will be partially omitted, and configuration and operation different from the above-described embodiments will be explained in particular.

In addition to the components of the optical measurement section 100 according to the fifth embodiment, the optical measurement section 100 according to the seventh embodiment includes a divider 114, a divider 118, and a divider 138.

The divider 114 divides the frequency of the electric signal 410 output from the photoelectrical converter 112 by the division ratio M, and outputs the electric signal 414. Moreover, the divider 138 divides the frequency of the electric signal 426 output from the photoelectric conversion section 136 by the same division ratio M as the divider 114, and outputs the electric signal 428. Moreover, the divider 118 divides the frequency of the reference signal 406 generated by the referential high frequency signal source 106 by the same division ratio M as the divider 114 and the divider 138, and outputs the reference signal 416.

The phase amplitude measurement block 302 receives the electric signal 414 output from the divider 114 through the transmission phase measurement input terminal 310, receives the electric signal 428 output from the divider 138 through the reflective phase measurement input terminal 330, and receives the reference signal 416 output from the divider 118 through the reference signal input terminal 320. Then, the phase amplitude measurement block 302 compares the phases of the electric signal 414 and the reference signal 416, and measures the wavelength dependence of the phase characteristic, such as the propagation delay time of the light which has transmitted the object to be measured 200. Moreover, the phase amplitude measurement block 302 compares the phases of the electric signal 428 and the reference signal 416, and measures the phase characteristic of the optical signal 422, i.e., the light reflected from the object to be measured 200. Moreover, the phase amplitude measurement block 302 receives the electric signal 410 output from the photoelectrical converter 112 through the transmission amplitude measurement input terminal 312, and receives the electric signal 426 output from the photoelectrical converter 136 through the reflective amplitude measurement input terminal 332. Then, the phase amplitude measurement block 302 measures the wavelength dependence of the amplitude of the optical signal 402 which has transmitted the object to be measured 200 (transmission attenuation) based on the electric signal 410. Moreover, the phase amplitude measurement block 302 measures the amplitude of the optical signal 422 reflected from the object to be measured 200 (reflective amplitude) based on an electric signal 426.

According to the optical network analyzer 10 of the seventh embodiment, since the cycle of each of the electric signal 414, the electric signal 428, and the reference signal 416 measured by the phase amplitude measurement block 302 is magnified M times by including the divider 114 for dividing the frequency of the electric signal 410 output from the photoelectrical converter 112 by M, the divider 138 for dividing the frequency of the electric signal 426 output from the photoelectrical converter 136 by M, and the divider 118 for dividing the frequency of the reference signal 406 generated by the referential high frequency signal source 106 by M, the shift of the phase of each of the electric signal 414 and the electric signal 428 is stably measurable.

Figure 8:
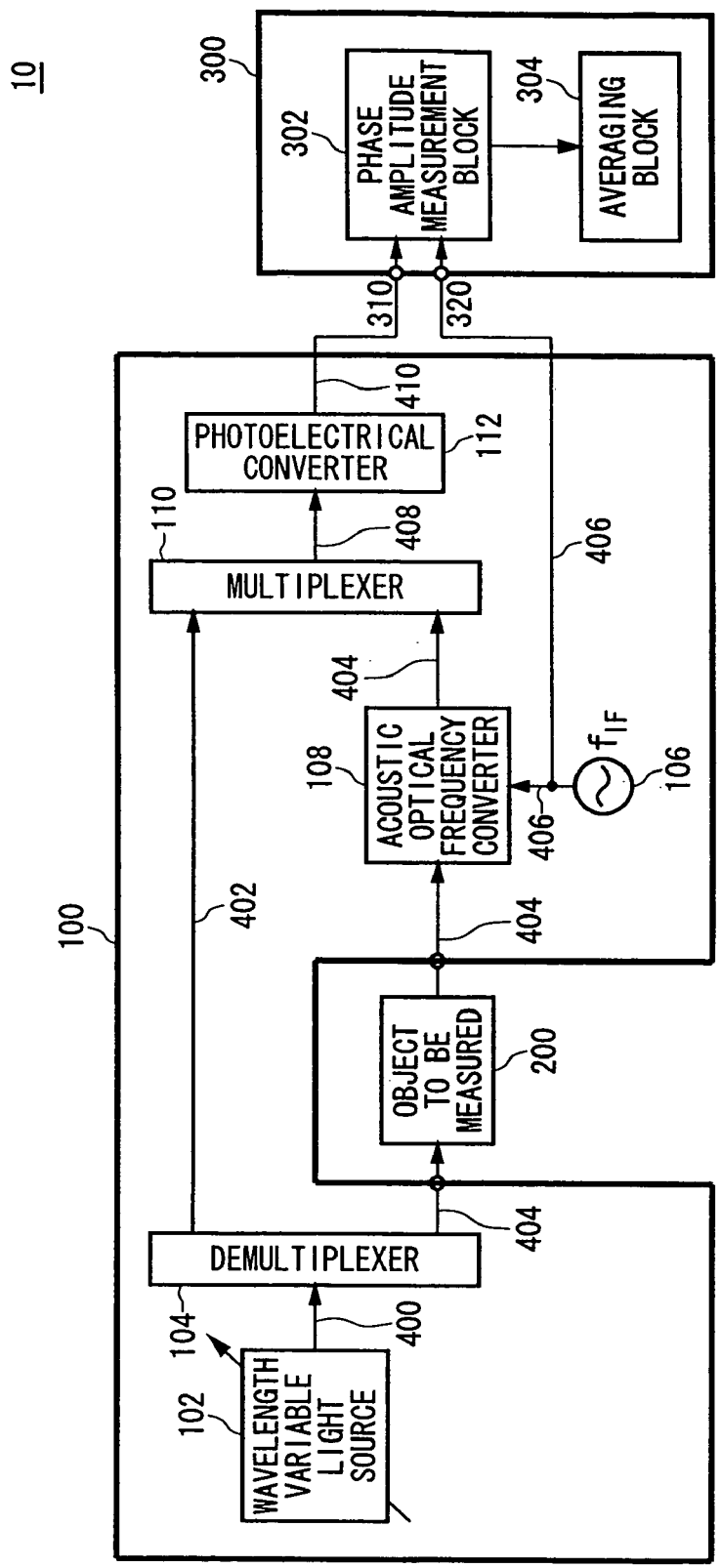
FIG. 8 is a block diagram of the optical network analyzer 10 according to an eighth embodiment.

FIG. 8 is a block diagram of a configuration of the optical network analyzer 10 according to an eighth embodiment of the present embodiment. In the eighth embodiment, the component similar to that of the optical network analyzer 10 according to the above-described embodiments bears the same reference numeral as that of the above-mentioned embodiments. Moreover, in the eighth embodiment, explanation about the same configuration and operation as the above-described embodiments will be partially omitted, and configuration and operation different from the above-described embodiments will be explained in particular.

The wavelength variable light source 102 generates the optical signal 400. Then, the demultiplexer 104 demultiplexes the optical signal 400 generated by the wavelength variable light source 102, and outputs the optical signal 402 and the optical signal 404. The optical signal 404 transmits the object to be measured 200, and is input into the acoustic optical frequency converter 108. Then, the acoustic optical frequency converter 108 converts the frequency of the optical signal 404, which has transmitted the object to be measured 200, based on the reference signal 406 generated by the referential high frequency signal source 106. The acoustic optical frequency converter 108 converts the frequency of the optical signal 404 and the optical signal 404 is input into the multiplexer 110. The optical signal 402 is output from the demultiplexer 104 and input into the multiplexer 110.

Next, the multiplexer 110 multiplexes the optical signal 402 and the optical signal 404 having a frequency different from the optical signal 402, and outputs the optical signal 408. Then, the photoelectrical converter 112 receives the optical signal 408 output from the multiplexer 110, and converts the optical signal 408 into the electric signal 410.

The phase amplitude measurement block 302 receives the electric signal 410 output from the photoelectrical converter 112 through the transmission measurement input terminal 310, and receives the reference signal 406 generated by the referential high frequency signal source 106 through the reference signal input terminal 320. Then, the phase amplitude measurement block 302 compares the phases of the electric signal 410 and the reference signal 406, and measures the wavelength dependence of the phase characteristic, such as the propagation delay time of the light which has transmitted the object to be measured 200. Moreover, the phase amplitude measurement block 302 measures the wavelength dependence of the amplitude of the optical signal 404 which has transmitted the object to be measured 200 (transmission attenuation) based on the electric signal 410. Then, the averaging block 304 calculates average of the values which are measured by the phase amplitude measurement block 302.

According to the optical network analyzer of the eighth embodiment, as the above-described embodiments, the wavelength dependence of the phase characteristic, such as the propagation delay time of the light which has transmitted the object to be measured 200, is measurable.

Figure 9:
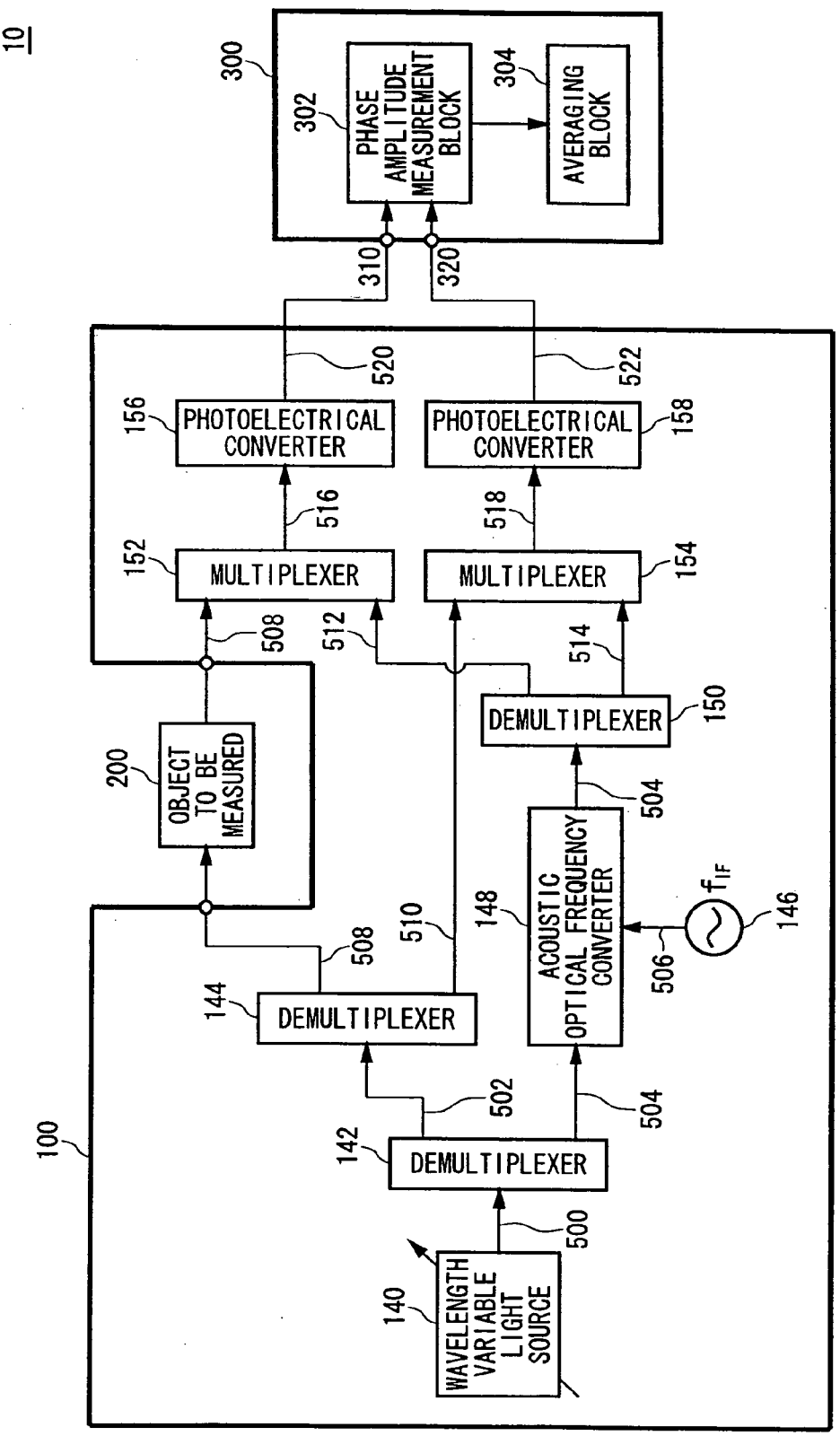
FIG. 9 is a block diagram of the optical network analyzer 10 according to a ninth embodiment.

FIG. 9 is a block diagram of a configuration of the optical network analyzer 10 according to a ninth embodiment of the present embodiment. In the ninth embodiment, the component similar to that of the optical network analyzer 10 according to the above-described embodiments bears the same reference numeral as that of the above-mentioned embodiments. Moreover, in the ninth embodiment, explanation about the same configuration and operation as the above-described embodiments will be partially omitted, and configuration and operation different from the above-described embodiments will be explained in particular.

The optical measurement section 100 according to the ninth embodiment includes a wavelength variable light source 140, a demultiplexer 142, a demultiplexer 144, a referential high frequency signal source 146, an acoustic optical frequency converter 148, a demultiplexer 150, a multiplexer 152, a multiplexer 154, a photoelectrical converter 156, and a photoelectrical converter 158.

The wavelength variable light source 140 generates an optical signal 500. Then, the demultiplexer 142 demultiplexes the optical signal 500 generated by the wavelength variable light source 140, and outputs an optical signal 502 and an optical signal 504. Then, the demultiplexer 144 demultiplexes the optical signal 502 output from the demultiplexer 142, and outputs an optical signal 508 and an optical signal 510. Moreover, the acoustic optical frequency converter 148 converts the frequency of the optical signal 504 output from the demultiplexer 142 based on a reference signal 506 generated by the referential high frequency signal source 146. Then, the demultiplexer 150 demultiplexes the optical signal 504, of which the frequency is converted by the acoustic optical frequency converter 148, and outputs an optical signal 512 and an optical signal 514. The optical signal 508 transmits the object to be measured 200, and is input into the multiplexer 152. The optical signal 510 is output from the demultiplexer 144 and input into the multiplexer 154. The optical signal 512 is output from the demultiplexer 150 and input into the multiplexer 152. The optical signal 514 is output from the demultiplexer 150 and input into the multiplexer 154.

Next, the multiplexer 152 multiplexes the optical signal 508 which has transmitted the object to be measured 200, and the optical signal 512 having a frequency different from the optical signal 508, and outputs an optical signal 516. Then, the photoelectrical converter 156 receives the optical signal 516 output from the multiplexer 152, and converts the optical signal 516 into an electric signal 520. Moreover, the multiplexer 154 multiplexes the optical signal 510 having substantially the same frequency as the optical signal 508, and the optical signal 514 having substantially the same frequency as the optical signal 512, and outputs an optical signal 518. Then, the photoelectrical converter 158 receives the optical signal 518 output from the multiplexer 154, and converts the optical signal 518 into an electric signal 522.

The phase amplitude measurement block 302 receives the electric signal 520 output from the photoelectrical converter 156 through the transmission measurement input terminal 310, and receives the electric signal 522 output from the photoelectrical converter 158 through the reference signal input terminal 320. Then, the phase amplitude measurement block 302 compares the phases of the electric signal 520 and the electric signal 522, and measures the wavelength dependence of the phase characteristic, such as the propagation delay time of the light which has transmitted the object to be measured 200. Moreover, the phase amplitude measurement block 302 measures the wavelength dependence of the amplitude of the optical signal 508 which has transmitted the object to be measured 200 (transmission attenuation) based on the electric signal 520. Moreover, the phase amplitude measurement block 302 compares the amplitude of the electric signal 520 and the electric signal 522, and measures the amplitude characteristic of the optical signal 508 which has transmitted the object to be measured 200 (transmission attenuation). Then, the averaging block 304 calculates average of the values which are measured by the phase amplitude measurement block 302.

According to the optical network analyzer 10 of the ninth embodiment, the phase amplitude measurement block 302 compensates fluctuation of the wavelength variable light source 140, drift of the acoustic optical frequency converter 148, etc., between the measured electric signal 520 and the referred electric signal 522 by generating the electric signal 522 to be input into the phase amplitude measurement block 302 through the reference signal input terminal 320 by converting the frequency of the optical signal 500 generated by the wavelength variable light source 140. Therefore, the wavelength dependence of the phase characteristic, such as the propagation delay time of the light which has transmitted the object to be measured 200, is measurable with sufficient accuracy.

Figure 10:
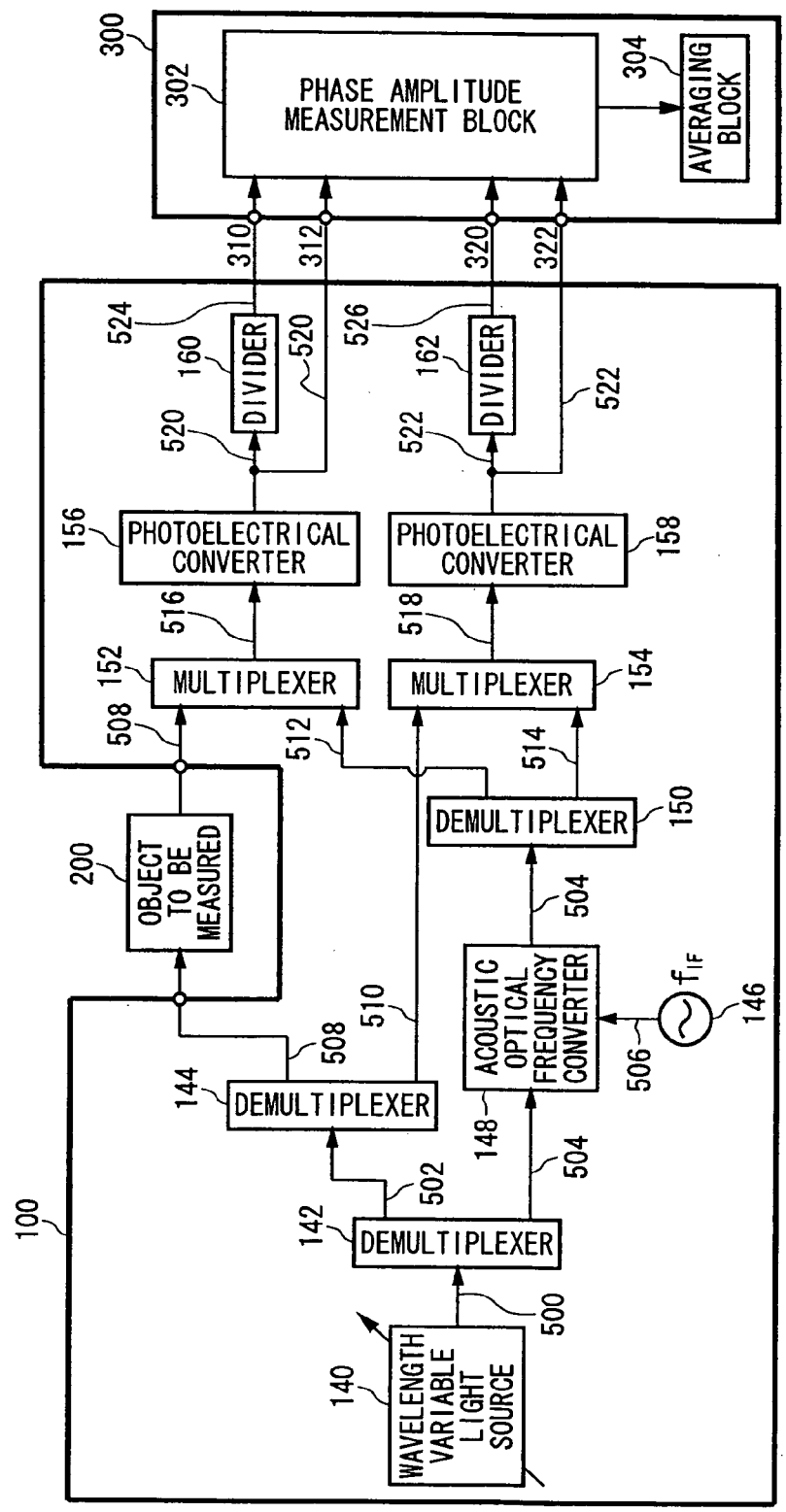
FIG. 10 is a block diagram of the optical network analyzer 10 according to a tenth embodiment.

FIG. 10 is a block diagram of a configuration of the optical network analyzer 10 according to a tenth embodiment of the present embodiment. In the tenth embodiment, the component similar to that of the optical network analyzer 10 according to the above-described embodiments bears the same reference numeral as that of the above-mentioned embodiments. Moreover, in the tenth embodiment, explanation about the same configuration and operation as the above-described embodiments will be partially omitted, and configuration and operation different from the above-described embodiments will be explained in particular.

In addition to the components of the optical measurement section 100 according to the ninth embodiment, the optical measurement section 100 according to the tenth embodiment includes a divider 160 and a divider 162.

The divider 160 divides the frequency of the electric signal 520 output from the photoelectrical converter 156 by the division ratio M, and outputs an electric signal 524. Moreover, the divider 162 divides the frequency of the electric signal 522 output from the photoelectrical converter 158 by the same division ratio M as the divider 160, and outputs an electric signal 526.

The phase amplitude measurement block 302 receives the electric signal 524 output from the divider 160 through the transmission phase measurement input terminal 310, and receives the electric signal 526 output from the divider 162 through the phase reference signal input terminal 320. Then, the phase amplitude measurement block 302 compares the phases of the electric signal 524 and the electric signal 526, and measures the wavelength dependence of the phase characteristic, such as the propagation delay time of the light which has transmitted the object to be measured 200. Moreover, the phase amplitude measurement block 302 receives the electric signal 520 output from the photoelectrical converter 156 through the transmission amplitude measurement input terminal 312, and receives the electric signal 522 output from the photoelectrical converter 158 through the amplitude reference signal input terminal 322. Then, the phase amplitude measurement block 302 measures the wavelength dependence of the amplitude of the optical signal 508 which has transmitted the object to be measured 200 (transmission attenuation) based on the electric signal 520. Moreover, the phase amplitude measurement block 302 compares the amplitude of the electric signal 520 and the electric signal 522, and measures the amplitude characteristic of the optical signal 508 which has transmitted the object to be measured 200 (transmission attenuation). Then, the averaging block 304 calculates average of the values which are measured by the phase amplitude measurement block 302.

According to the optical network analyzer 10 of the tenth embodiment, since the cycle of each of the electric signal 524 and the electric signal 526 measured by the phase amplitude measurement block 302 is magnified M times by including the divider 160 for dividing the frequency of the electric signal 520 output from the photoelectrical converter 156 by M, and by including the divider 162 for divining the frequency of the electric signal 522 output from the photoelectrical converter 158 by M, shift of the phase of the electric signal 524 is stably measurable.

Figure 11:
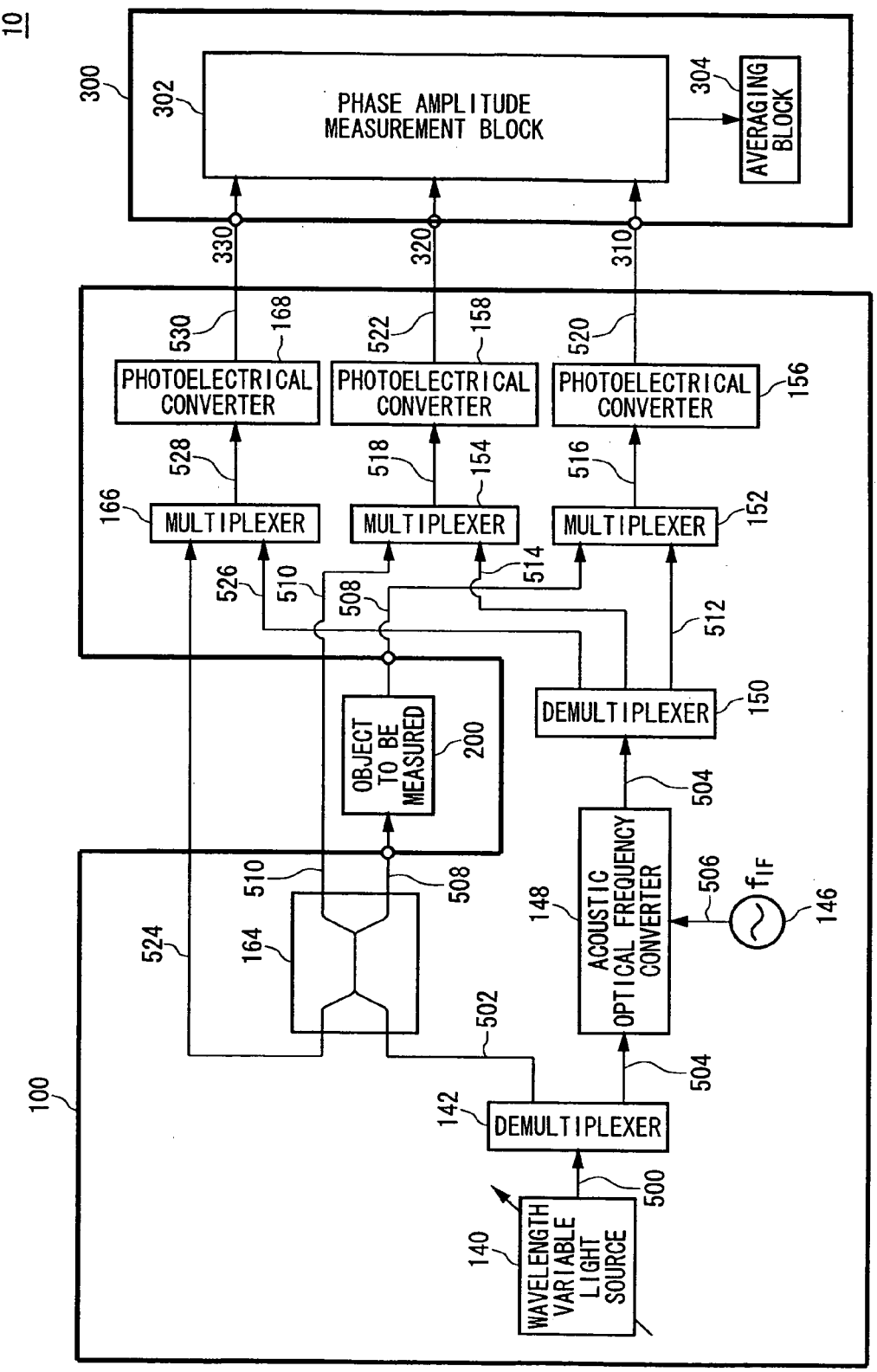
FIG. 11 is a block diagram of the optical network analyzer 10 according to an eleventh embodiment.

FIG. 11 is a block diagram of a configuration of the optical network analyzer 10 according to an eleventh embodiment of the present embodiment. In the eleventh embodiment, the component similar to that of the optical network analyzer 10 according to the above-described embodiments bears the same reference numeral as that of the above-mentioned embodiments. Moreover, in the eleventh embodiment, explanation about the same configuration and operation as the above-described embodiments will be partially omitted, and configuration and operation different from the above-described embodiments will be explained in particular.

In addition to the component of the optical measurement section 100 according to the ninth embodiment, the optical measurement section 100 according to the eleventh embodiment includes a multiplexer 166 and a photoelectrical converter 168. Moreover, the optical measurement section 100 according to the eleventh embodiment includes a directional coupler 164 substituting for the demultiplexer 144 of the optical measurement section 100 according to the ninth embodiment.

The wavelength variable light source 140 generates the optical signal 500. Then, the demultiplexer 142 demultiplexes the optical signal 500 generated by the wavelength variable light source 140, and outputs the optical signal 502 and the optical signal 504. Then, the directional coupler 164 demultiplexes the optical signal 502 output from the demultiplexer 142, and outputs the optical signal 508 and the optical signal 510. Then, the optical signal 508 passes through the directional coupler 164 and is incidence on the object to be measured 200, and the directional coupler 164 allows the optical signal 524, which has been reflected from the object to be measured 200, to pass through it. Moreover, the acoustic optical frequency converter 148 converts the frequency of the optical signal 504 output from the demultiplexer 142 based on the reference signal 506 generated by the referential high frequency signal source 146. Then, the demultiplexer 150 demultiplexes the optical signal 504, of which the frequency is converted by the acoustic optical frequency converter 148, and outputs the optical signal 512, the optical signal 514, and the optical signal 526. The optical signal 508 transmits the object to be measured 200 and is input into the multiplexer 152. The optical signal 510 is output from the directional coupler 164 and input into the multiplexer 154. The optical signal 512 is output from the demultiplexer 150 and input into the multiplexer 152. The optical signal 514 is output from the demultiplexer 150 and input into the multiplexer 154. The optical signal 526 is output from the demultiplexer 150 and input into the multiplexer 166. The optical signal 524 is output from the directional coupler 164 and input into the multiplexer 166.

Next, the multiplexer 152 multiplexes the optical signal 508 which has transmitted the object to be measured 200, and the optical signal 512 having a frequency different from the optical signal 508, and outputs the optical signal 516. Then, the photoelectrical converter 156 receives the optical signal 516 output from the multiplexer 152, and converts the optical signal 516 into the electric signal 520. Moreover, the multiplexer 154 multiplexes the optical signal 510 having substantially the same frequency as the optical signal 508, and the optical signal 514 having substantially the same frequency as the optical signal 512, and outputs the optical signal 518. Then, the photoelectrical converter 158 receives the optical signal 518 output from the multiplexer 154, and converts the optical signal 518 into the electric signal 522.

Moreover, the multiplexer 166 multiplexes the optical signal 524 reflected from the object to be measured 200, and the optical signal 526 having substantially the same frequency as the optical signal 512, and outputs an optical signal 528. Then, the photoelectrical converter 168 receives the optical signal 528 output from the multiplexer 166, and converts the optical signal 528 into an electric signal 530.

The phase amplitude measurement block 302 receives the electric signal 520 output from the photoelectrical converter 156 through the transmission measurement input terminal 310, receives the electric signal 522 output from the photoelectrical converter 158 through the reference signal input terminal 320, and receives the electric signal 530 output from the photoelectrical converter 168 through the reflective measurement input terminal 330. Then, the phase amplitude measurement block 302 compares the phases of the electric signal 520 and the electric signal 522, and measures the wavelength dependence of the phase characteristic, such as the propagation delay time of the transmitted light of the object to be measured 200. Moreover, the phase amplitude measurement block 302 compares the phases of the electric signal 530 and the electric signal 522, and measures the phase characteristic of the optical signal 524, i.e., the light reflected from the object to be measured 200. Moreover, the phase amplitude measurement block 302 measures the wavelength dependence of the amplitude of the optical signal 508 which has transmitted the object to be measured 200 (transmission attenuation) based on the electric signal 520. Moreover, the phase amplitude measurement block 302 measures the amplitude of the optical signal 524 reflected from the object to be measured 200 (reflective amplitude) based on the electric signal 530. Moreover, the phase amplitude measurement block 302 compares the amplitude of the electric signal 520 and the electric signal 522, and measures the amplitude characteristic of the optical signal 508 which has transmitted the object to be measured 200 (transmission attenuation). Moreover, the phase amplitude measurement block 302 compares the amplitude of the electric signal 530 and the electric signal 522, and measures the amplitude characteristic of the optical signal 524 reflected from the object to be measured 200 (reflective amplitude). Then, the averaging block 304 calculates average of the values which are measured by the phase amplitude measurement block 302.

According to the optical network analyzer 10 of the eleventh embodiment, the amplitude characteristic and the phase characteristic of the reflected light in addition to the amplitude characteristic and the phase characteristic of the transmitted light are measurable by the optical measurement section 100 including the directional coupler 164 which allows the reflected light from the object to be measured 200 to pass through it, and by the network analyzer 300 including the reflective measurement signal input terminal 330 for the reflected light in addition to the transmission measurement signal input terminal 310 for the transmitted light. Moreover, according to the optical network analyzer 10 according to the eleventh embodiment, the phase amplitude measurement block 302 compensates fluctuation of the wavelength variable light source 140, drift of the acoustic optical frequency converter 148, etc., between the measured electric signals 520 and 530, and the referred electric signal 522 by generating the electric signal 522 to be input into the phase amplitude measurement block 302 through the reference signal input terminal 320 by converting the frequency of the optical signal 500 generated by the wavelength variable light source 140. Therefore, the wavelength dependence of phase characteristic and the amplitude characteristic, such as transmission attenuation and the propagation delay time of the object to be measured 200, are measurable with sufficient accuracy.

Figure 12:
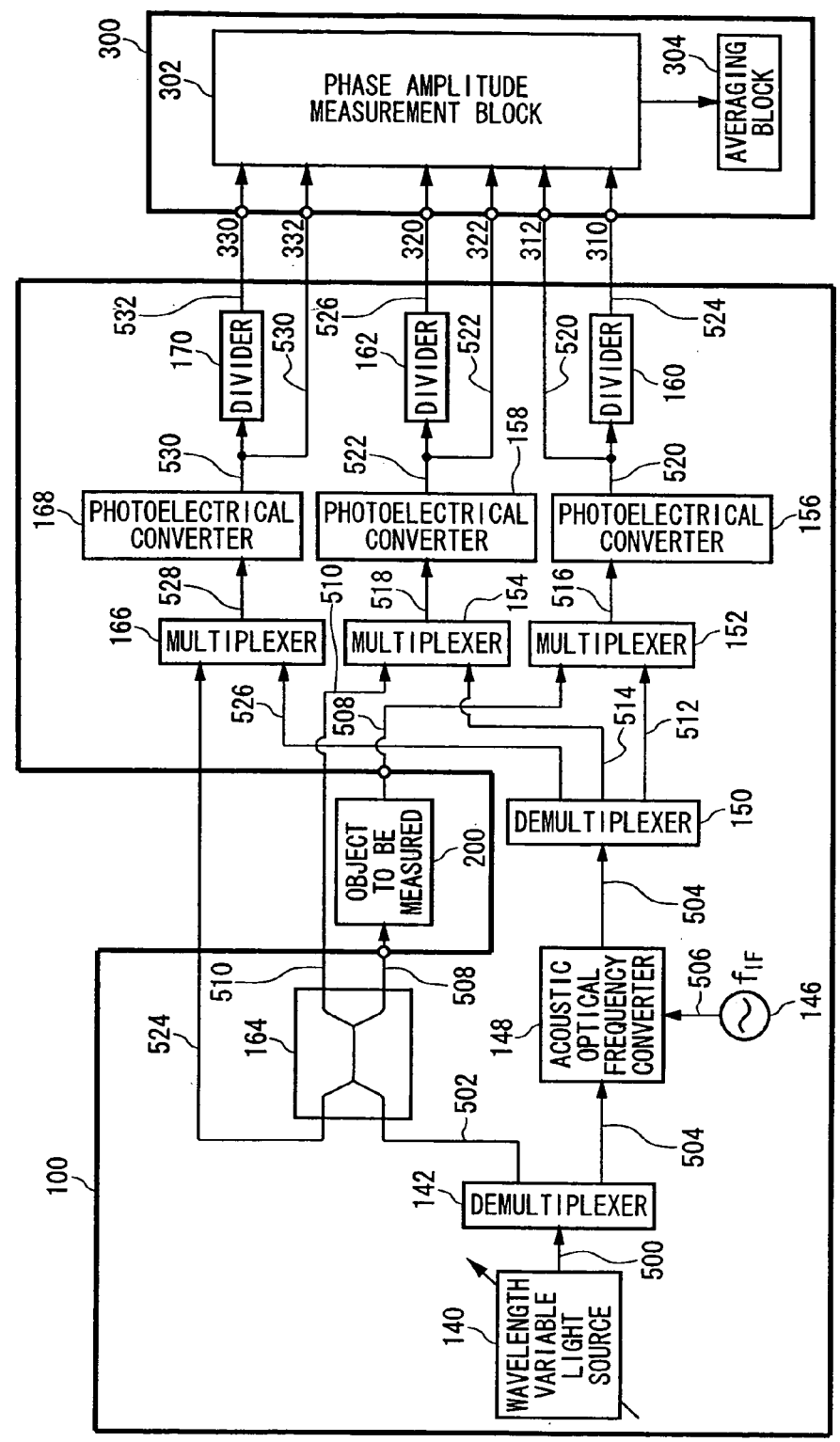
FIG. 12 is a block diagram of the optical network analyzer 10 according to a twelfth embodiment.

FIG. 12 is a block diagram of a configuration of the optical network analyzer 10 according to a twelfth embodiment of the present embodiment. In the twelfth embodiment, the component similar to that of the optical network analyzer 10 according to the above-described embodiments bears the same reference numeral as that of the above-mentioned embodiments. Moreover, in the twelfth embodiment, explanation about the same configuration and operation as the above-described embodiments will be partially omitted, and configuration and operation different from the above-described embodiments will be explained in particular.

In addition to the components of the optical measurement section 100 according to the eleventh embodiment, the optical measurement section 100 according to the twelfth embodiment includes a divider 160, a divider 162, and a divider 170.

The divider 160 divides the frequency of the electric signal 520 output from the photoelectrical converter 156 by the division ratio M, and outputs an electric signal 524. Moreover, the divider 162 divides the frequency of the electric signal 522 output from the photoelectrical converter 158 by the same division ratio M as the divider 160, and outputs an electric signal 526. Moreover, the divider 170 divides the frequency of the electric signal 530 output from the photoelectrical converter 168 by the same division ratio M as the divider 160 and the divider 162, and outputs an electric signal 532.

The phase amplitude measurement block 302 receives the electric signal 524 output from the divider 160 through the transmission phase measurement input terminal 310, receives the electric signal 532 output from the divider 170 through the reflective phase measurement input terminal 330, and receives the electric signal 526 output from the divider 162 through the phase reference signal input terminal 320. Then, the phase amplitude measurement block 302 compares the phases of the electric signal 524 and the electric signal 526, and measures the wavelength dependence of the phase characteristic, such as the propagation delay time of the light which has transmitted the object to be measured 200. Moreover, the phase amplitude measurement block 302 compares the phases of the electric signal 532 and the electric signal 526, and measures the phase characteristic of the optical signal 524, i.e., the light reflected from the object to be measured 200. Moreover, the phase amplitude measurement block 302 receives the electric signal 520 output from the photoelectrical converter 156 through the transmission amplitude measurement input terminal 312, receives the electric signal 530 output from the photoelectrical converter 168 through the reflective amplitude measurement input terminal 332, and receives the electric signal 522 output from the photoelectrical converter 158 through the amplitude reference signal input terminal 322. Then, the phase amplitude measurement block 302 measures the wavelength dependence of the amplitude of the optical signal 508 which has transmitted the object to be measured 200 (transmission attenuation) based on the electric signal 520. Moreover, the phase amplitude measurement block 302 measures the amplitude of the optical signal 524 reflected from the object to be measured 200 (reflective amplitude) based on the electric signal 530. Moreover, the phase amplitude measurement block 302 compares the amplitude of the electric signal 520 and the electric signal 522, and measures the amplitude characteristic of the optical signal 508 which has transmitted the object to be measured 200

(transmission attenuation). Moreover, the phase amplitude measurement block 302 compares the amplitude of the electric signal 530 and the electric signal 522, and measures the amplitude characteristic of the optical signal 524 reflected from the object to be measured 200 (reflective amplitude). Then, the averaging block 304 calculates average of the values which are measured by the phase amplitude measurement block 302.

According to the optical network analyzer 10 of the twelfth embodiment, since the cycle of each of the electric signal 524, the electric signal 526, and the electric signal 532 measured by the phase amplitude measurement block 302 is magnified M times by including the divider 160 for dividing the frequency of the electric signal 520 output from the photoelectrical converter 156 by M, the divider 162 for dividing the frequency of the electric signal 522 output from the photoelectrical converter 158 by M, and the divider 170 for dividing the frequency of the electric signal 530 output from the photoelectrical converter 168 by M, the shift of the phase of the electric signal 524 is stably measurable.

Figure 13:
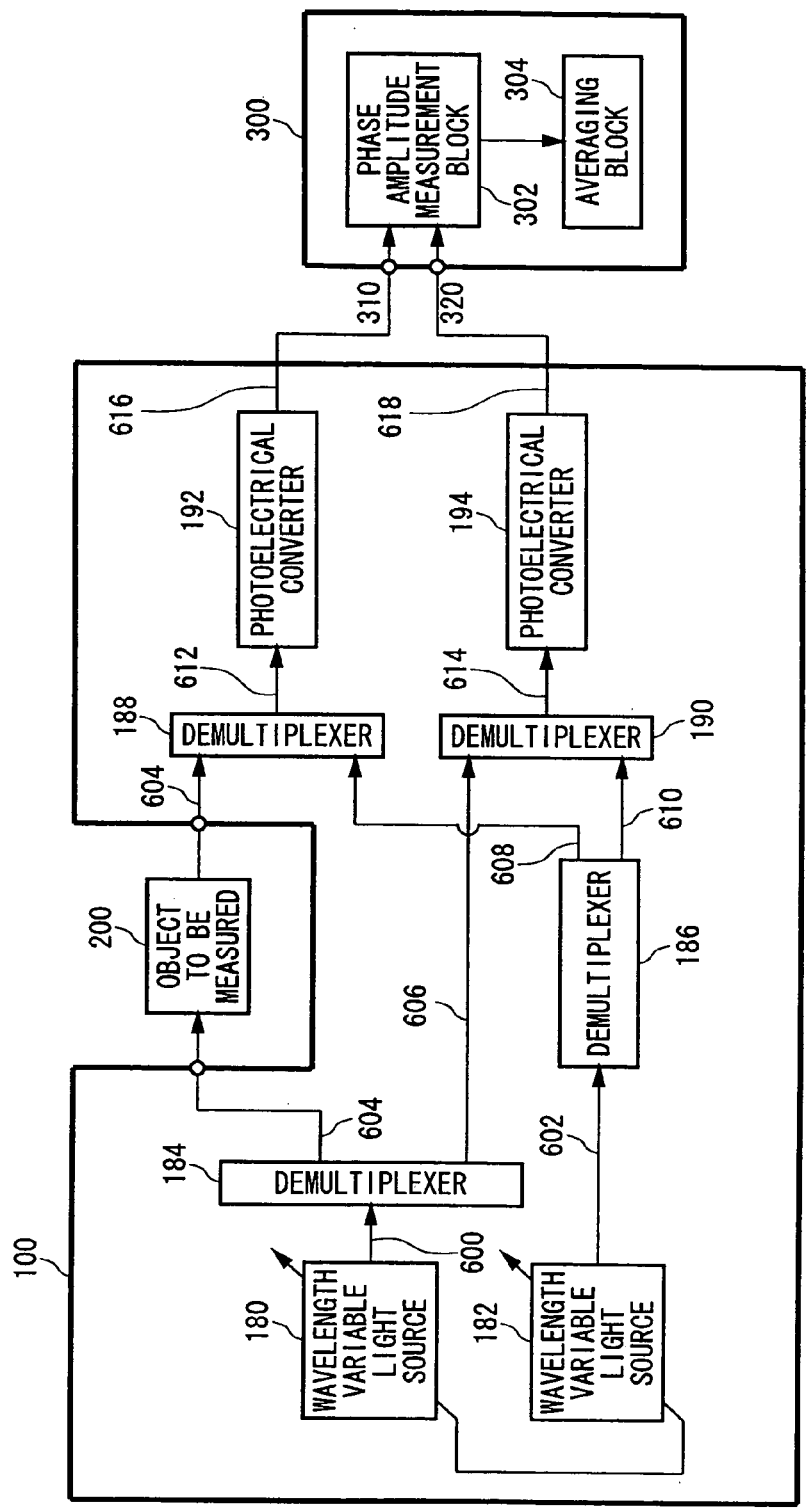
FIG. 13 is a block diagram of the optical network analyzer 10 according to a thirteenth embodiment.

FIG. 13 is a block diagram of a configuration of the optical network analyzer 10 according to a thirteenth embodiment of the present embodiment. In the thirteenth embodiment, the component similar to that of the optical network analyzer 10 according to the above-described embodiments bears the same reference numeral as that of the above-mentioned embodiments. Moreover, in the thirteenth embodiment, explanation about the same configuration and operation as the above-described embodiments will be partially omitted, and configuration and operation different from the above-described embodiments will be explained in particular.

The optical measurement section 100 according to the thirteenth embodiment includes a wavelength variable light source 180, a wavelength variable light source 182, a demultiplexer 184, a demultiplexer 186, a multiplexer 188, a multiplexer 190, a photoelectrical converter 192, and a photoelectrical converter 194. The wavelength variable light source 180 and the wavelength variable light source 182 generate optical signals, respectively, where frequency difference between the two optical signals is constant. Alternatively, the wavelength variable light source 180 and the wavelength variable light source 182 vary the frequency of the optical signals respectively so that the frequency difference between them may become constant.

The wavelength variable light source 180 generates an optical signal 600. Then, the demultiplexer 184 demultiplexes the optical signal 600 generated by the wavelength variable light source 180, and outputs an optical signal 604 and an optical signal 606. Moreover, the wavelength variable light source 182 generates an optical signal 602 having a frequency different from the optical signal 600. Then, the demultiplexer 186 demultiplexes the optical signal 602 generated by the wavelength variable light source 182, and outputs an optical signal 608 and an optical signal 610. The optical signal 604 transmits the object to be measured 200, and is input into the multiplexer 188. The optical signal 606 is output from the demultiplexer 184 and input into the multiplexer 190. The optical signal 608 is output from the demultiplexer 186 and input into the multiplexer 188. The optical signal 610 is output from the demultiplexer 186 and input into the multiplexer 190.

Next, the multiplexer 188 multiplexes the optical signal 604 which has transmitted the object to be measured 200 and the optical signal 608 having a frequency different from the optical signal 604, and outputs an optical signal 612. Then, the photoelectrical converter 192 receives the optical signal 612 output from the multiplexer 188, and converts the optical signal 612 into an electric signal 616. Moreover, the multiplexer 190 multiplexes the optical signal 606 having substantially the same frequency as the optical signal 604, and the optical signal 610 having substantially the same frequency as the optical signal 608, and outputs an optical signal 614. Then, the photoelectrical converter 194 receives the optical signal 614 output from the multiplexer 190, and converts the optical signal 614 into an electric signal 618.

The phase amplitude measurement block 302 receives the electric signal 616 output from the photoelectrical converter 192 through the transmission measurement input terminal 310, and receives the electric signal 618 output from the photoelectrical converter 194 through the reference signal input terminal 320. Then, the phase amplitude measurement block 302 compares the phases of the electric signal 616 and the electric signal 618, and measures the wavelength dependence of the phase characteristic, such as the propagation delay time of the light which has transmitted the object to be measured 200. Moreover, the phase amplitude measurement block 302 measures the wavelength dependence of the amplitude of the optical signal 604 which has transmitted the object to be measured 200 (transmission attenuation) based on the electric signal 616. Then, the averaging block 304 calculates average of the values which are measured by the phase amplitude measurement block 302.

Since the optical network analyzer 10 according to the thirteenth embodiment includes the wavelength variable light source 180 and the wavelength variable light source 182 which generate the optical signals, the frequency difference between them being constant, and the signals are measured by the heterodyne detection using the frequency difference of the optical signals generated by the wavelength variable light source 180 and the wavelength variable light source 182, respectively, the measurement is performed with high signal-to-noise ratio.

Figure 14:
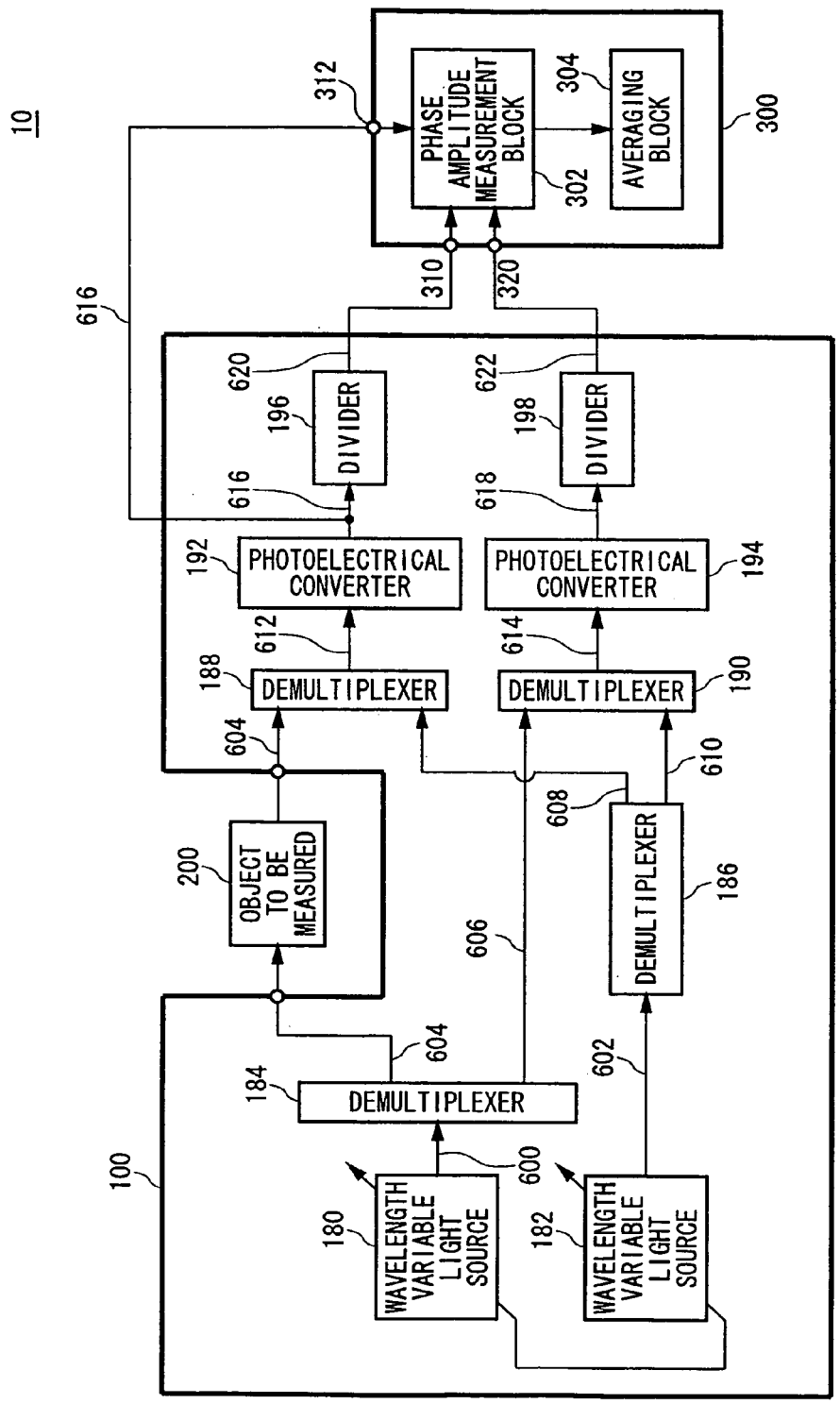
FIG. 14 is a block diagram of the optical network analyzer 10 according to a fourteenth embodiment.

FIG. 14 is a block diagram of a configuration of the optical network analyzer 10 according to a fourteenth embodiment of the present embodiment. In the fourteenth embodiment, the component similar to that of the optical network analyzer 10 according to the above-described embodiments bears the same reference numeral as that of the above-mentioned embodiments. Moreover, in the fourteenth embodiment, explanation about the same configuration and operation as the above-described embodiments will be partially omitted, and configuration and operation different from the above-described embodiments will be explained in particular.

In addition to the components of the optical measurement section 100 according to the thirteenth embodiment, the optical measurement section 100 according to the fourteenth embodiment includes a divider 196 and a divider 198.

The divider 196 divides the frequency of the electric signal 616 output from the photoelectrical converter 192 by the division ratio M, and outputs an electric signal 620. Moreover, the divider 198 divides the frequency of an electric signal 618 output from the photoelectrical converter 194 by the same division ratio M as the divider 196, and outputs an electric signal 622.

The phase amplitude measurement block 302 receives the electric signal 620 output from the divider 196 through the transmission phase measurement input terminal 310, and receives the electric signal 622, of which the frequency is divided by the divider 198, through the reference signal input terminal 320. Then, the phase amplitude measurement block 302 compares the phases of the electric signal 620 and the electric signal 622, and measures the wavelength dependence of the phase characteristic, such as the propagation delay time of the light which has transmitted the object to be measured 200. Moreover, the phase amplitude measurement block 302 receives the electric signal 616 output from the photoelectrical converter 192 through the transmission amplitude measurement input terminal 312. Then, the phase amplitude measurement block 302 measures the wavelength dependence of the amplitude of the optical signal 604 which has transmitted the object to be measured 200 (transmission attenuation) based on the electric signal 616. Then, the averaging block 304 calculates average of the values which are measured by the phase amplitude measurement block 302.

According to the optical network analyzer 10 of the fourteenth embodiment, since the cycle of each of the electric signal 620 and the electric signal 622 measured by the phase amplitude measurement block 302 is magnified M times by including the divider 196 for dividing the frequency of the electric signal 616 output from the photoelectrical converter 192 by M, and the divider 198 for dividing the frequency of the electric signal 618 output from the photoelectrical converter 194 by M, shift of the phase of the electric signal 620 is stably measurable.

According to the optical network analyzer 10 of the above-described embodiments, when the optical signal which has transmitted the object to be measured, and the optical signal of which the frequency is converted by the acoustic optical frequency converter are multiplexed by the multiplexer, since a beat, of which the frequency is the frequency difference between the two optical signals, is observed, the signal is detected by the heterodyne detection by converting the optical beat into the electric signal. Therefore, as compared with the direct detection according to the conventional optical network analyzer shown in FIG. 15, the signal-to-noise ratio beyond the shot-noise limit is improved by approximately 10–20 dB. Therefore, the propagation characteristics of the object to be measured having a high dynamic range is measurable.

Figure 15:
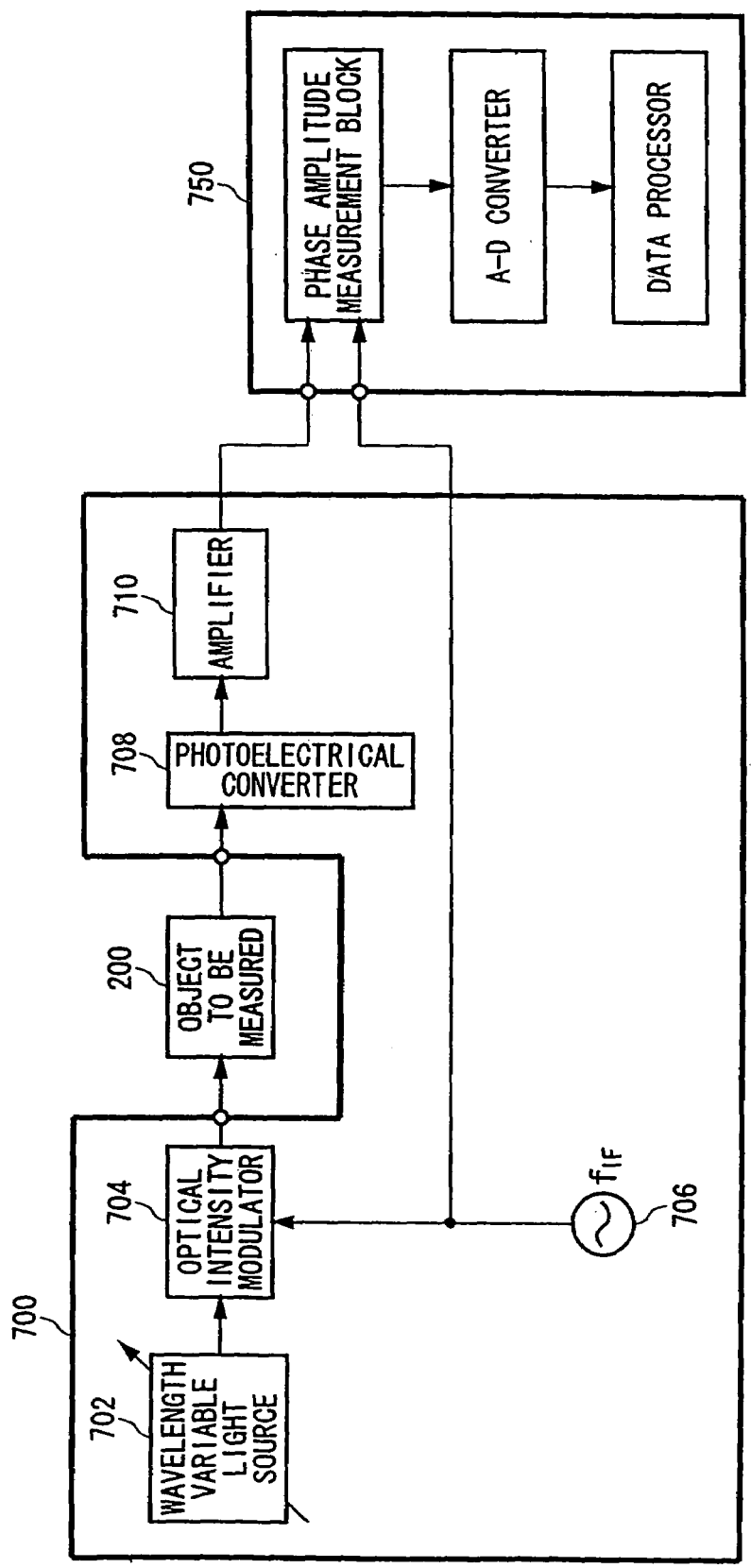
FIG. 15 is a block diagram of a conventional optical network analyzer.
Figure 16:
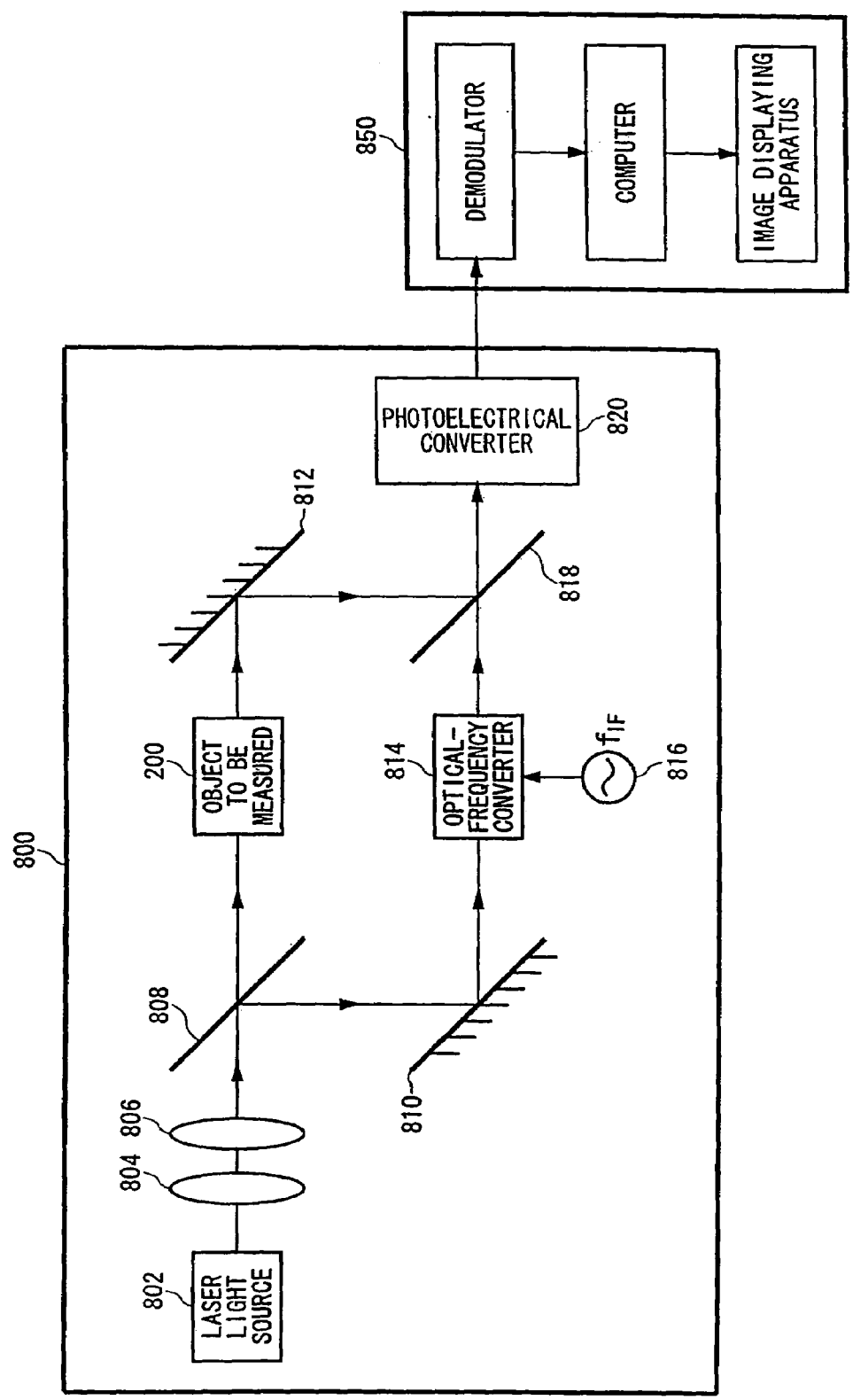
FIG. 16 is a block diagram of a conventional image detection apparatus.

Moreover, since the optical intensity modulator is not included between the wavelength variable light source and the photoelectrical converter, a transmission characteristic with lower drift noise is measurable than the conventional optical network analyzer shown in FIG. 15. Furthermore, since the phase is measured, the propagation delay time is measurable, which is unable to be measured by the conventional image detection apparatus shown in FIG. 16. Furthermore, the wavelength characteristics is measurable, which is unable to be measured by the conventional image detection apparatus shown in FIG. 16, by making the wavelength of the optical signal variable, which is generated by the wavelength variable light source.

Moreover, since the optical signal which is incidence on the object to be measured is a continuous coherent light, wavelength characteristic is measurable with high resolution.

Moreover, by providing the divider at the downstream of the photoelectrical converter for measuring the phase of the signal to be measured, of which the frequency is divided by a predetermined division ratio, instead of measuring the signal to be measured itself, the cycle of the signal to be measured is magnified by the predetermined division ratio, and the shift of the phase of the signal to be measured is measurable more stably. Furthermore, since the phase is compared by dividing the frequency of the measured signal, fluctuation and the minute time variation in the light measurement system are averaged, and the shift of the phase of the signal to be measured is measurable more stably. Furthermore, since the range and resolution of the propagation-delay-time measurement are set up by the division ratio of the divider, it does not strongly depend on the conversion frequency of the acoustic optical frequency converter.

Moreover, by employing the optical waveguides like optical fibers for the optical path from the wavelength variable light source to the multiplexer, the planes of polarization of the optical signals to be input into the multiplexer are easily aligned to be parallel. Therefore, there is provided the optical network analyzer that is easily manufactured.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

As described above, according to the present invention, there is provided the optical network analyzer for accurately measuring the transmission characteristics, delay characteristics, etc. of the light of various optical elements.

What is claimed is:

1. An optical network analyzer for measuring an optical characteristic of an object to be measured, comprising:

a first multiplexer for multiplexing a first optical signal which has transmitted or reflected from the object to be measured, and a second optical signal having a frequency different from the first optical signal, and for outputting a third optical signal;

a first photoelectrical converter for converting the third optical signal into a first electric signal;

a second multiplexer for multiplexing a fourth optical signal having substantially the same frequency as the first optical signal, and a fifth optical signal having substantially the same frequency as the second optical signal, and for outputting a sixth optical signal;

a second photoelectrical converter for converting the sixth optical signal into a second electric signal;

a first divider for dividing a frequency of the first electric signal;

a second divider for dividing a frequency of the second electric signal; and a phase measurement block for comparing phases of the first electric signal and the second electric signal, wherein said phase measurement block receives the first electric signal, of which the frequency is divided by said first divider, and the second electric signal, of which the frequency is divided by said second divider, and compares phases of the first electric signal and the second electric signal.

2. The optical network analyzer as claimed in claim 1, further comprising:

a light source for generating a seventh optical signal;

a first demultiplexer for demultiplexing the seventh optical signal and for outputting an eighth optical signal and a ninth optical signal;

a second demultiplexer for demultiplexing the eighth optical signal, and for outputting the first optical signal and the fourth optical signal;

a first reference signal generating section for generating a first reference signal;

a frequency converter for converting a frequency of the ninth optical signal based on the first reference signal; and a third demultiplexer for demultiplexing the ninth optical signal, of which the frequency is converted, to the second optical signal and a fifth optical signal.

3. The optical network analyzer as claimed in claim 2, further comprising an amplitude measurement section for receiving the first electric signal converted by said first photoelectrical converter and for measuring amplitude of the first optical signal which has transmitted the object to be measured.

4. The optical network analyzer as claimed in claim 3, wherein said amplitude measurement section further receives the second electric signal converted by said second photoelectrical converter, and compares amplitude of the first optical signal and the fourth optical signal.

5. The optical network analyzer as claimed in claim 1, further comprising:

a first light source for generating a seventh optical signal;

a first demultiplexer for demultiplexing the seventh optical signal and for outputting the first optical signal and the fourth optical signal;

a second light source for generating the eighth optical signal; and a second demultiplexer for demultiplexing the eighth optical signal and for outputting the second optical signal and the fifth optical signal.

6. The optical network analyzer as claimed in claim 5, further comprising an amplitude measurement section for receiving the first electric signal converted by said first photoelectrical converter and for measuring amplitude of the first optical signal which has transmitted the object to be measured.

7. The optical network analyzer as claimed in claim 6, wherein said amplitude measurement section further receives the second electric signal converted by said second photoelectrical converter, and compares amplitude of the first optical signal and the fourth optical signal.

* * * * *